(12) United States Patent
Sun et al.

(10) Patent No.: US 10,125,558 B2
(45) Date of Patent: Nov. 13, 2018

(54) PUMPS-OFF ANNULAR PRESSURE WHILE DRILLING SYSTEM

(71) Applicant: Schlumberger Technology Corporation, Sugar land, TX (US)

(72) Inventors: Yong Sun, Sugar Land, TX (US); Bo Yu, Sugar Land, TX (US); Sandra Reyes, Tuffley (GB); Aldrick Garcia-Mayans, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 222 days.

(21) Appl. No.: 14/710,457

(22) Filed: May 12, 2015

(65) Prior Publication Data

US 2015/0330168 A1 Nov. 19, 2015

Related U.S. Application Data

(60) Provisional application No. 61/992,604, filed on May 13, 2014, provisional application No. 62/158,614, filed on May 8, 2015.

(51) Int. Cl.
*G01V 3/00* (2006.01)
*E21B 21/08* (2006.01)
(Continued)

(52) U.S. Cl.
CPC .............. *E21B 21/08* (2013.01); *E21B 21/10* (2013.01); *E21B 47/06* (2013.01); *E21B 47/12* (2013.01); *G05B 15/02* (2013.01)

(58) Field of Classification Search
CPC .......... E21B 21/08; E21B 21/10; E21B 47/06; E21B 47/12; G05B 15/02
(Continued)

(56) References Cited

U.S. PATENT DOCUMENTS 4,302,757 A * 11/1981 Still ..................... E21B 47/122
340/854.4
5,252,031 A * 10/1993 Gibbs ................. E21B 47/0006
417/18
(Continued)

FOREIGN PATENT DOCUMENTS

EP 2505971 A2 10/2012
WO 2003098266 A1 11/2003
(Continued)

OTHER PUBLICATIONS

International Search Report and Written Opinion issued in corresponding International Application No. PCT/US2015/030493, dated Aug. 10, 2015, 8 Pages.
(Continued)

*Primary Examiner* — Zhen Y Wu

(57) ABSTRACT

Aspects of the disclosure can relate to a method for transmitting a pump-off pressure profile within a limited bandwidth. For example, a method may include selecting a compression protocol based upon at least one of a time length associated with the pump-off pressure data, a relative mean-squared error associated with the pump-off pressure data, or a maximum error associated with the pump-off pressure data. The method also includes compressing pump-off pressure data with the compression protocol to produce compression bits. The compression bits represent the pump-off pressure profile. The method also includes transmitting, via a communication module, the compression bits to a computing device.

18 Claims, 33 Drawing Sheets

(51) Int. Cl.
*E21B 47/06* (2012.01)
*E21B 21/10* (2006.01)
*G05B 15/02* (2006.01)
*E21B 47/12* (2012.01)

(58) Field of Classification Search
USPC ..................................................... 340/854.4
See application file for complete search history.

(56) References Cited

U.S. PATENT DOCUMENTS

| | | |
|---|---|---|
| 2002/0011333 A1 | 1/2002 | Ward |
| 2003/0214879 A1* | 11/2003 | Proett .................. E21B 49/008 367/81 |
| 2004/0045706 A1 | 3/2004 | Pop et al. |
| 2004/0145503 A1* | 7/2004 | Blanch .................... G01V 1/48 341/76 |
| 2006/0015257 A1* | 1/2006 | Hassan .................. E21B 47/00 702/6 |
| 2006/0055556 A1 | 3/2006 | Memarzadeh et al. |
| 2006/0195612 A1* | 8/2006 | Alvarez Arevalo ........................ H04L 29/06027 709/246 |
| 2006/0235618 A1* | 10/2006 | Wu .......................... G01V 1/46 702/6 |
| 2006/0294448 A1* | 12/2006 | Wybenga .............. H04L 1/0041 714/758 |
| 2007/0162235 A1* | 7/2007 | Zhan .................... E21B 49/008 702/6 |
| 2007/0194947 A1* | 8/2007 | Huang ................. E21B 41/0085 340/854.3 |
| 2007/0198192 A1* | 8/2007 | Hsu ........................ E21B 47/12 702/6 |
| 2008/0131087 A1* | 6/2008 | Lee ..................... H04N 19/593 386/326 |
| 2009/0034367 A1* | 2/2009 | Sherrill ................. G01V 1/247 367/47 |
| 2009/0101340 A1 | 4/2009 | Jeffryes |
| 2009/0165548 A1* | 7/2009 | Pop ....................... E21B 49/008 73/152.51 |
| 2009/0190850 A1* | 7/2009 | Tang ...................... G01V 11/00 382/251 |
| 2009/0294174 A1 | 12/2009 | Harmer et al. |
| 2011/0051805 A1* | 3/2011 | Van Splunter ... H04N 19/00339 375/240.03 |
| 2011/0139464 A1 | 6/2011 | Henderson et al. |
| 2011/0206114 A1* | 8/2011 | Kim ....................... H04N 7/363 375/240.02 |
| 2011/0272144 A1 | 11/2011 | Belcher et al. |
| 2014/0214325 A1* | 7/2014 | Wessling ................ E21B 47/06 702/11 |
| 2014/0286538 A1 | 9/2014 | Yu et al. |
| 2015/0330168 A1 | 11/2015 | Sun et al. |
| 2016/0097275 A1* | 4/2016 | Santoso ................ E21B 47/123 340/854.7 |
| 2016/0227298 A1* | 8/2016 | White ..................... H04Q 9/00 |

FOREIGN PATENT DOCUMENTS

| | | |
|---|---|---|
| WO | WO2005096013 A1 | 10/2005 |
| WO | WO2013052423 A2 | 4/2013 |

OTHER PUBLICATIONS

International Search Report and Written Opinion issued in related PCT application PCT/US2016/031147 dated Aug. 17, 2016, 12 pages.
International Preliminary Report on Patentability issued in International Patent application PCT/US2015/030493, dated Nov. 24, 2016. 6 pages.
International Preliminary Report on Patentability issued in International Patent application PCT/US2016/031147, dated Nov. 23, 2017. 6 pages.
Search Report issued in European Patent application 15792034.9 dated Jan. 19, 2018. 8 pages.
Non-Final Office Action issued in U.S. Appl. No. 15/146,590 dated Feb. 8, 2018. 8 pages.

\* cited by examiner

Definitions:
- A pressure curve of N pressure points: $P(i)$, $i=1,\ldots,N$.
- $P_{max}/P_{min}$: the maximum/minimum pressure value, respectively Normalization:
$$P_{norm}(i) = \frac{P(i)-P_{min}}{P_{max}-P_{min}}, \quad i=1,\ldots,N.$$

Denormalization:
$$P(i) = P_{norm}(i) \cdot (P_{max} - P_{min}) + P_{min}, \quad i=1,\ldots,N.$$

FIG. 8

For example: 6 coefficients as 1.3, 8.4, -3.5, 0.0, 2.3, -0.6
All coefficients are transformed into binary formats and a bit-plane can be generated as shown in the following table (the green part). Each column corresponds to one coefficient (together with the sign bit and the magnitude bits starting from the most significant bit (MSB) with $n_{max}=3$).

| coeffs | | 1.3 | 8.4 | -3.5 | 0.0 | 2.3 | -0.6 |
|---|---|---|---|---|---|---|---|
| sign bit | | + | + | - | n/a | + | - |
| The n-th magnitude bit | $n_{max}=3$ | 0 | 1 | 0 | 0 | 0 | 0 |
| | n=2 | 0 | 0 | 0 | 0 | 0 | 0 |
| | n=1 | 0 | 0 | 1 | 0 | 1 | 0 |
| | n=0 | 1 | 0 | 1 | 0 | 0 | 0 |
| | n=-1 | 0 | 0 | 1 | 0 | 0 | 1 |
| | n=-2 | 1 | 1 | 0 | 0 | 1 | 0 |
| | ... | ... | ... | ... | ... | ... | ... |

FIG. 10

Bit-plane coding:

*Encoding process:*
1. Initialization:
   1) A set to contain the indices of significant coefficients LSP = [];
   2) A set to contain the indices of insignificant coefficients LIP=[1,...,N] (N is the total # of coefficients)
   3) The maximum bit index $n_{max}$ = [$\log_2$(max magnitude of coefficients)]
2. Let n = $n_{max}$
   1) Sorting pass: check the coefficients whose indices are in LIP:
      - if the magnitude of the coefficient $\geq 2^n$:
        o output significance bit 1;
        o output sign bit 0 as + and 1 as-;
        o move its index from L1P to LSP; //a new significant coefficient is found
      - else,
        o output significance bit 0;
   2) Refinement pass:
      - output the refinement bits, i.e., the n-th bits of the coefficients in LSP (excluding the newly-found significant coefficiens in the sorting pass at the current n).
   3) n = n-1, goto 1).

*Decoding process:*
1. The decoding follows the same process of encoding (but replacing "output" as "input") to recover the bit-plane.
2. Each decoded significant coefficient is adjusted by adding $2^{nlast-1}$ to its magnitude, where $n_{max}$ is the last bit index decoded for this coefficient. This compensation will help reduce the decoding error. For example, a coefficient is decoding as 2 with $n_{last}$ = 0. Its true value can be [2,3]. Its true value can be [2,3]. Without the compensation by adding $2^{nlast-1}$ to its magnitude its decoding value becomes 2.5 and the MAE reduces to 0.25.

Coding results for the example in Figure 6:
1. After 3 passes, the 6 coefficients are coded into 21 bits as show below:

| n | output bits (significance bit: x, sign bit: x, refinement bit: x) |
|---|---|
| 3 | 0 1 0 0 0 0 0 |
| 2 | 0 0 0 0 0 0 |
| 1 | 0 1 1 0 1 0 0 0 |

2. The decoded coefficients will be [0 9 -3 0 3 0].

FIG. 11

| Time length of pressure curve | Candidate MODFIDs | # of info bits |
|---|---|---|
| < 3 minutes | 0,1,2 | 121,157,202 |
| 3~5 minutes | 1,2,3 | 157,202,240 |
| 5~10 minutes | 1,2,3,4 | 157,202,240,300 |
| 10~20 minutes | 2,3,4 | 202,240,300 |
| 20~30 minutes | 2,3,4,(4+0)[1] | 202,240,300,421 |
| 30 minutes ~ 8 hours | A sequence of MODFs[2] | Maximum 200 per 15 minutes[3] |

FIG. 22

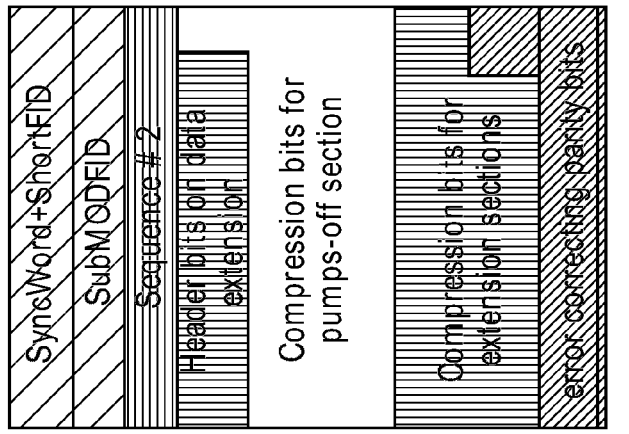
3rd MODF
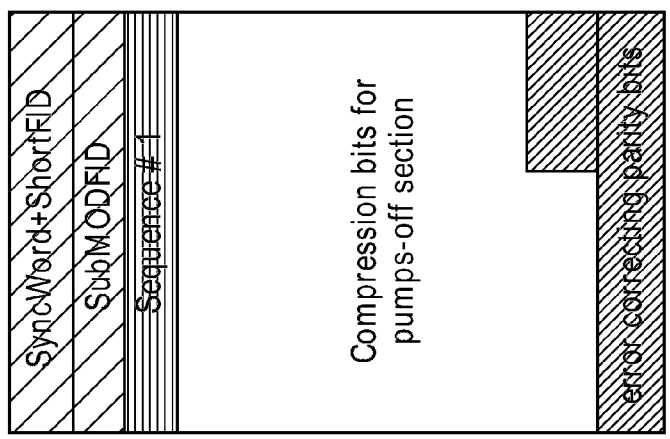
2nd MODF
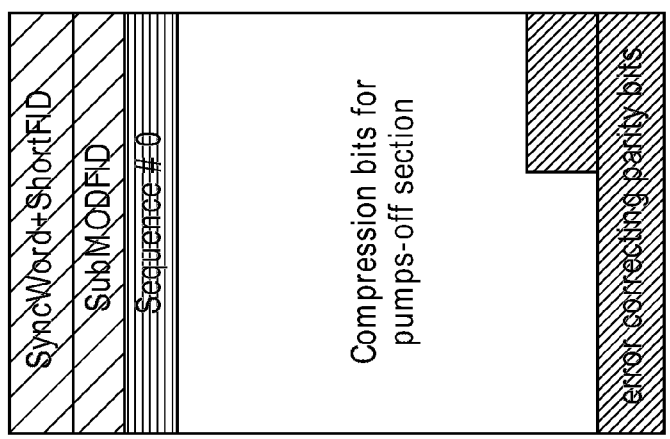
1st MODF
FIG. 28

PUMPS-OFF ANNULAR PRESSURE WHILE DRILLING SYSTEM

BACKGROUND

Oil wells are created by drilling a hole into the earth using a drilling rig that rotates a drill string (e.g., drill pipe) having a drill bit attached thereto. The drill bit, aided by the weight of pipes (e.g., drill collars), cuts into rock within the earth to create a wellbore. Drilling fluid (e.g., mud) is pumped into the drill pipe and exits at the drill bit. The drilling fluid may be used to cool the bit, lift rock cuttings to the surface, at least partially prevent destabilization of the rock in the wellbore, and/or at least partially overcome the pressure of fluids inside the rock so that the fluids do not enter the wellbore. During the creation of the wellbore, these drilling rigs can measure the physical properties of the well environment. Data representing the measurements can be transmitted to the surface as pressure pulses in a mud system (e.g., mud pulse telemetry) of the oil well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Aspects of the disclosure can relate to a method for transmitting a pump-off pressure profile within a limited bandwidth. For example, a method may include selecting a compression protocol based upon at least one of a time length associated with the pump-off pressure data, a relative mean-squared error associated with the pump-off pressure data, or a maximum error associated with the pump-off pressure data. The method also includes compressing pump-off pressure data with the compression protocol to produce compression bits. The compression bits represent the pump-off pressure profile. The method also includes transmitting, via a communication module, the compression bits to a computing device.

Other aspects of the disclosure can relate to a bottom hole assembly. The bottom hole assembly may include a downhole tool to measure pump-off pressure data. The downhole tool can comprise a controller to select a compression protocol based upon at least one of a time length associated with the pump-off pressure data, a relative mean-squared error associated with the pump-off pressure data, or a maximum error associated with the pump-off pressure data. The controller also compresses the pump-off pressure data utilizing the compression protocol to produce compression bits and causes a communication module to transmit the plurality of compression bits to a receiver.

Also, aspects of the disclosure can relate to a system that includes a bottom hole assembly. The bottom hole assembly includes a downhole tool to measure pump-off pressure data within a wellbore. The downhole tool can comprise a controller that selects a compression protocol based upon at least one of a time length associated with the pump-off pressure data, a relative mean-squared error associated with the pump-off pressure data, or a maximum error associated with the pump-off pressure data and compresses the pump-off pressure data with the compression protocol to produce compression bits. The bottom hole assembly can also include a communication module to transmit the compression bits.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings illustrate example embodiments, and are, therefore, not to be considered limiting of its scope.

FIG. 8 illustrates example formulas for normalization and denormalization in accordance with an example embodiment of the present disclosure.

FIG. 10 illustrates a table of an illustrative bit-plane for six (6) coefficients in accordance with an example embodiment of the present disclosure.

FIG. 11 illustrates an illustrative bit-plane coding scheme in accordance with an example embodiment of the present disclosure.

FIG. 22 illustrates a bit allocation for pressure curves of various lengths and candidate multiple on-demand frames to transmit compressed pressure data bits representing a pressure curve in accordance with an example embodiment of the present disclosure.

FIG. 28 illustrates a sequence of three (3) multiple on-demand frames including pumps-off section data and extension section data in accordance with an example embodiment of the present disclosure.

DETAILED DESCRIPTION

Figure 1:
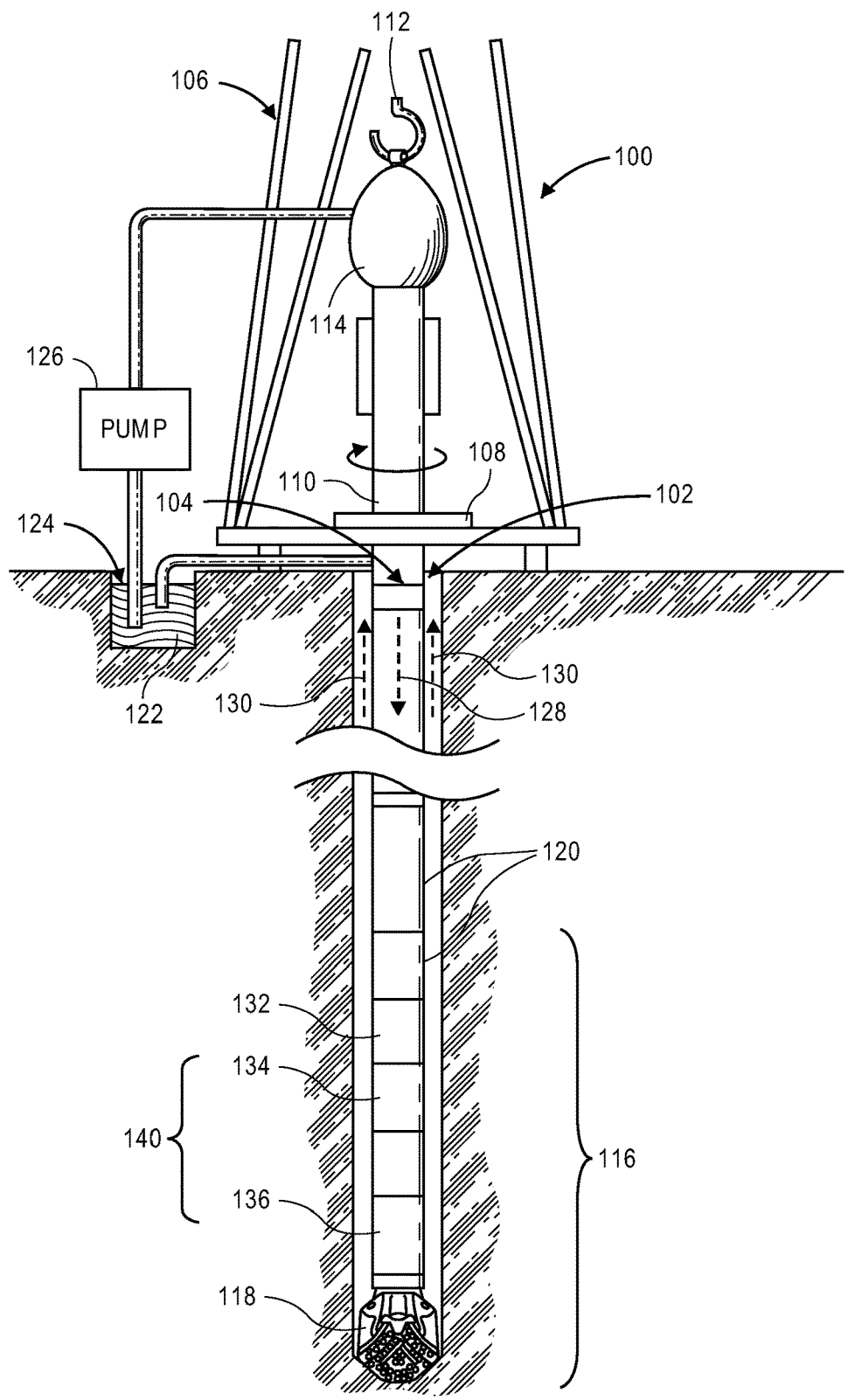
FIG. 1 illustrates an example system illustrating embodiments of a downhole tool that transmits a pump-off pressure profile within a limited bandwidth using mud-pulse telemetry.

Embodiments described herein generally relate to methods for measuring pressure within a wellbore. More particularly, embodiments described herein relate to a system and a method for transmitting a pump-off pressure profile in a wellbore.

A hydraulic mud system may be utilized while drilling. A column of the drill rig may build a hydrostatic pressure head in the annular space between the drill-string and the wellbore wall. To maintain wellbore stability, the hydrostatic pressure should be higher than the formation fluid (e.g., pore) pressure so that an influx of formation fluid into the wellbore can be prevented. However, a hydrostatic pressure that exceeds the formation fracture pressure may result in mud entering the formation and resulting in formation damage and fluid loss.

Consequently, downhole tools can measure the pressure data when the pumps are off (e.g., during common pump cycle like pipe connection or pressure integrity test (PIT) such as Leak-Off Test (LOT)). The measured pump-off pressure data can be transmitted to a computing device outside of the wellbore utilizing suitable mud pulse telemetry techniques. Based upon the measured pump-off pressure data, the computing device can generate a pump-off pressure curve allowing an estimation of the hydrostatic pressure. Yet, due to the limited bandwidth relating to mud-pulse telemetry, the transmission of the measured pressure data uphole may not take place in real-time unless the pressure data is compressed. For example, for a five (5) minute pressure curve that contains one hundred and fifty (150) pressure points obtained at a sampling rate of two (2) seconds, a transmission without compression would take twelve and a half (12.5) minutes at 3.0 b/s telemetry speed if fifteen (15) bits are used to code each pressure point. Thus, the present disclosure is directed to a system and a method of measuring annular pressure (e.g., pump-off pressure data) within a wellbore, compressing the annular pressure into compression data, and transmitting the compressed pressure data outside of the wellbore (e.g., transmitting the compressed pressure data to the surface). In embodiments, the annular pressure data comprises high density annular pressure data utilized for formation integrity testing (FIT) and/or leakoff testing (LOT). The computing device can then generate a pump-off pressure curve, which may allow operators to make adjustments to the drill rig based upon the pump-off pressure curve.

FIG. 1 illustrates a wellsite system 100 for measuring annular pressure (e.g., pump-off pressure data) within a wellbore, compressing the annular pressure into compression data, and transmitting the compressed pressure data outside of the wellbore in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example only and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly (as indicated by directional arrow 130) through the annulus region between the outside of the drill string 104 and the wall of the borehole 102. In this manner, the drilling fluid 122 cools and lubricates the drill bit 118 and carries drill cuttings generated by the drill bit 118 up to the surface (e.g., as the drilling fluid 122 is returned to the pit 124 for recirculation).

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. In embodiments of the disclosure, the logging-while drilling module 132 includes capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components for generating electrical power for the downhole equipment. This can include a mud turbine generator (also referred to as a "mud motor") powered by the flow of the drilling fluid 122. However, this configuration is provided by way of example only and is not meant to limit the present disclosure. In other embodiments, other power and/or battery systems can be employed. The measuring-while-drilling module 134 can include one or more of the following measuring devices: a weight-on-bit measuring device, a torque measuring device, a vibration measuring device, a shock measuring device, a stick slip measuring device, a direction measuring device, an inclination measuring device, and so on.

In embodiments of the disclosure, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform).

Figure 2:
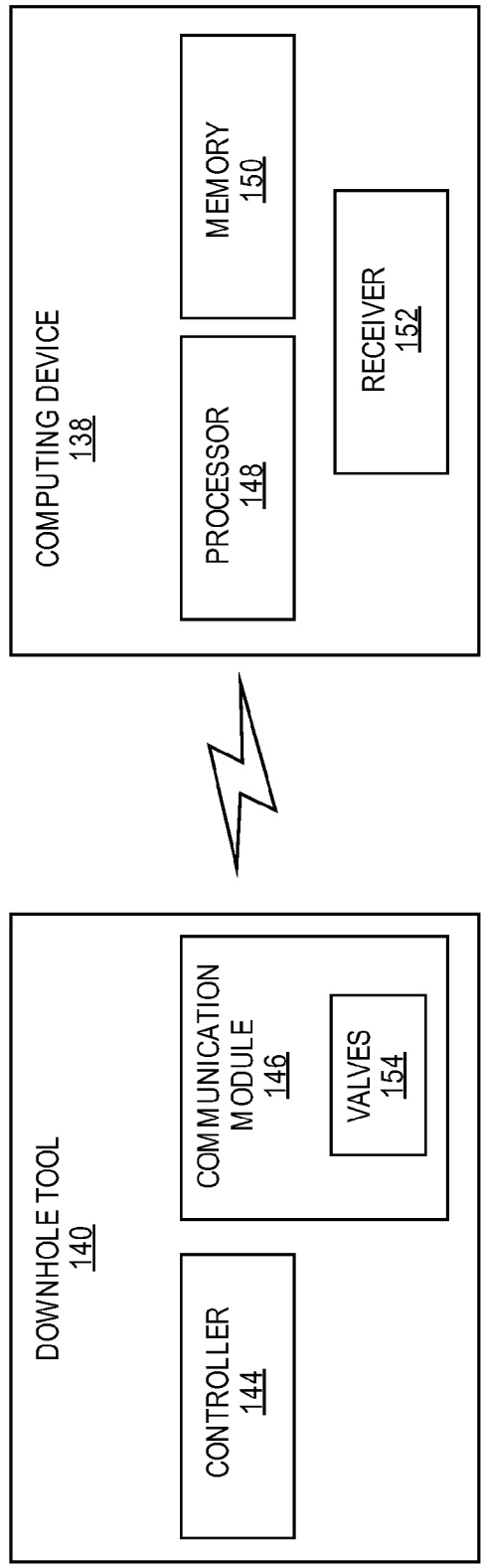
FIG. 2 illustrates a block diagram of a downhole tool of the present disclosure in communication with a computing device, where the computing device can generate a pump-off pressure data profile based upon compressed pressure data received from the downhole tool.

As shown in FIGS. 1 and 2, the bottom hole assembly 116 comprises a downhole tool 140. In embodiments, the downhole tool 140 is configured to compile (e.g., measure) annular pressure data during pumps-off (pump-off pressure data) and compress the pump-off data representing a pump-off pressure profile curve. In embodiments, the downhole tool 140 selects a compression protocol from multiple compression protocol to compress the pumps-off pressure data and to transmit the compressed pumps-off data uphole. In embodiments of the present disclosure, an up-to eight (8) hour pressure curve can be transmitted in real time (or near-real time) to uphole devices. In the event the pressure curve exceeds eight (8) hours, the last eight (8) hour portion of the pressure curve can be transmitted.

As shown in FIG. 2, the downhole tool 140 includes a controller 144. The controller 144 can implement control logic, and can receive and process signals from sensors configured to compress pump-off pressure data utilizing a selected compression protocol as discussed herein. The downhole tool 140 also includes a communication module 146. In embodiments, the communication module 146 comprises one or more valves 154 for modulating the flow of drilling fluid in the bore of the drill string 104, which generates pressure pulses (e.g,. mud pulse telemetry) that can be detected at the surface. Thus, the one or more valves 154 can be modulated accordingly to transmit, using mud pulse telemetry, the compressed pressure data to the receiver 152.

In embodiments, the downhole tool 140 may comprise the logging-while-drilling (LWD) module 132, the measuring-while-drilling (MWD) module 134, a combination thereof, or other device capable of compressing pump-off pressure data and transmitting the compressed pump-off pressure data by way of mud-pulse telemetry to a computing device 138 outside of the wellbore (e.g., uphole). In embodiments, the computing device 138 includes a processor 148, a memory 150, and a receiver 152. As described herein, the receiver 152 receives compressed pressure data from the downhole tool 140. The compressed pressure data represents a pump-off pressure profile. The memory 150 can store the compressed pressure data, and the processor 148 can execute computer-executable instructions to cause the processor 148 to generate a pump-off pressure profile.

The present disclosure first discusses selection of a compression protocol utilized to compress the measured pressure data as well as the various compression protocols that can be utilized to compress the measured pressure data. The present disclosure then discusses transmission protocols for transmitting the compressed pressure data uphole. For example, the compressed pressure data may be transmitted utilizing multiple on-demand frames as described herein.

Figure 3:
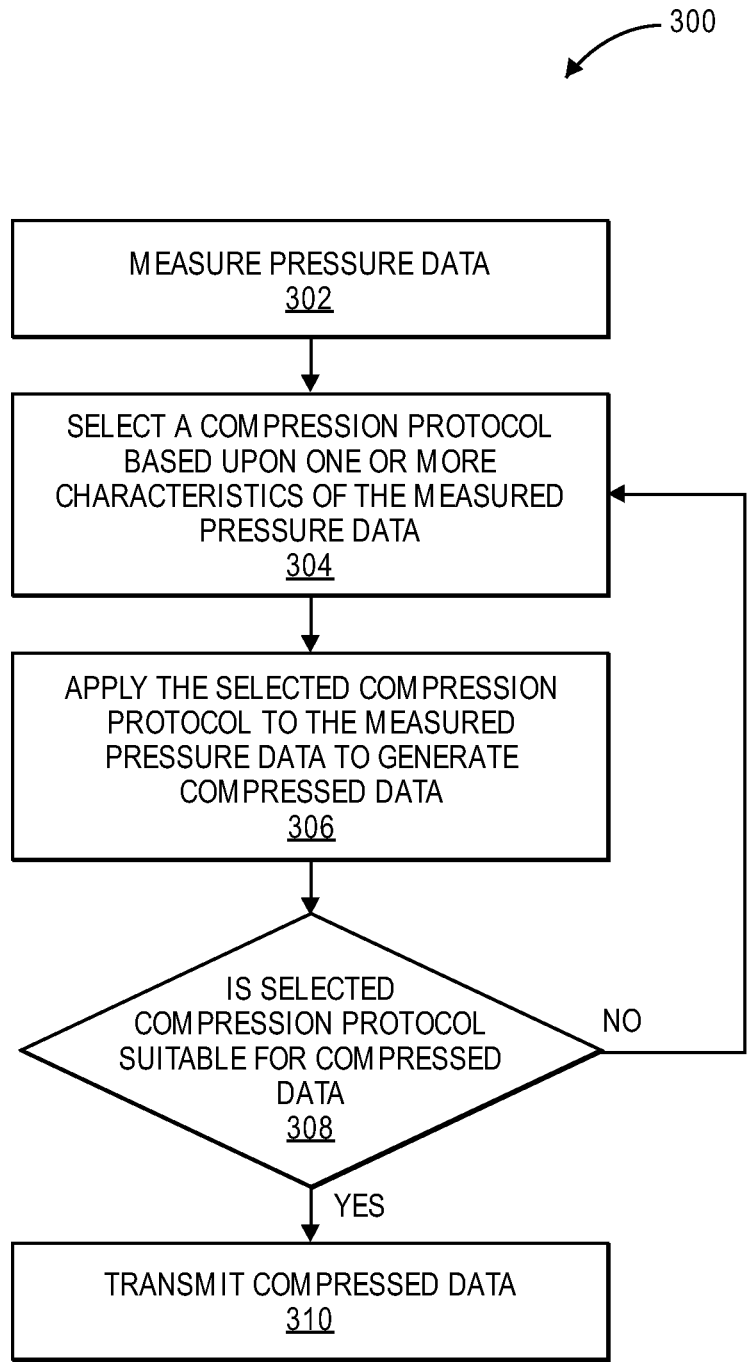
FIG. 3 illustrates a flow chart for selecting a compression protocol and applying a selected compression protocol to measured pressure data in accordance with an example embodiment of the present disclosure.

FIG. 3 illustrates an example method 300 for selecting a compression protocol and transmitting compressed pressure data in accordance with the present disclosure. As shown, annular pressure (pump-off pressure data) is measured (Block 302). For example, during pumps-off, the logging-while drilling module 132 measures the annular pressure within the wellbore. A compression protocol is selected from multiple compression protocols based upon one or more characteristics of the measured pressure data (Block 304). For example, the controller 144 can select a compression protocol from three different compression protocols (e.g., a smart sampling compression protocol, a direct wavelet compression protocol, or a model-based wavelet compression protocol) based upon one or more characteristics of the measured pressure data and/or associated pressure curve. For example, as discussed in greater detail below, the controller 144 automatically selects a compression protocol based upon the time-length of the pressure curve and one or more quality factors associated with the pressure curve. The selected compression protocol is applied to the measured pressure data to generate compressed pressure data (Block 306). For example, once the controller 144 selects the compression protocol based upon the one or more characteristics, the controller 144 applies the selected compression protocol to the measured pressure data to generate compressed pressure data. As shown in FIG. 3, a determination is made of whether the selected compression protocol is suitable for the compressed pressure data (Decision Block 308). If the characteristics of the compressed pressure data and/or associated pressure curve are within a defined threshold (Yes from Decision Block 308), the compressed pressure data is transmitted uphole (Block 310). If the characteristics of the compressed pressure data and/or associated pressure curve are not within a defined threshold (No from Decision Block 308), another compression protocol is selected based upon the characteristics of the measured pressure data (Block 304). As described in greater detail herein, the compressed pressure data is transmitted uphole utilizing mud-pulse telemetry. For example, the controller 144 can cause the compressed pressure data to be transmitted in near real-time using multiple on-demand frames (MODFs), as described in greater detail below.

Figure 4:
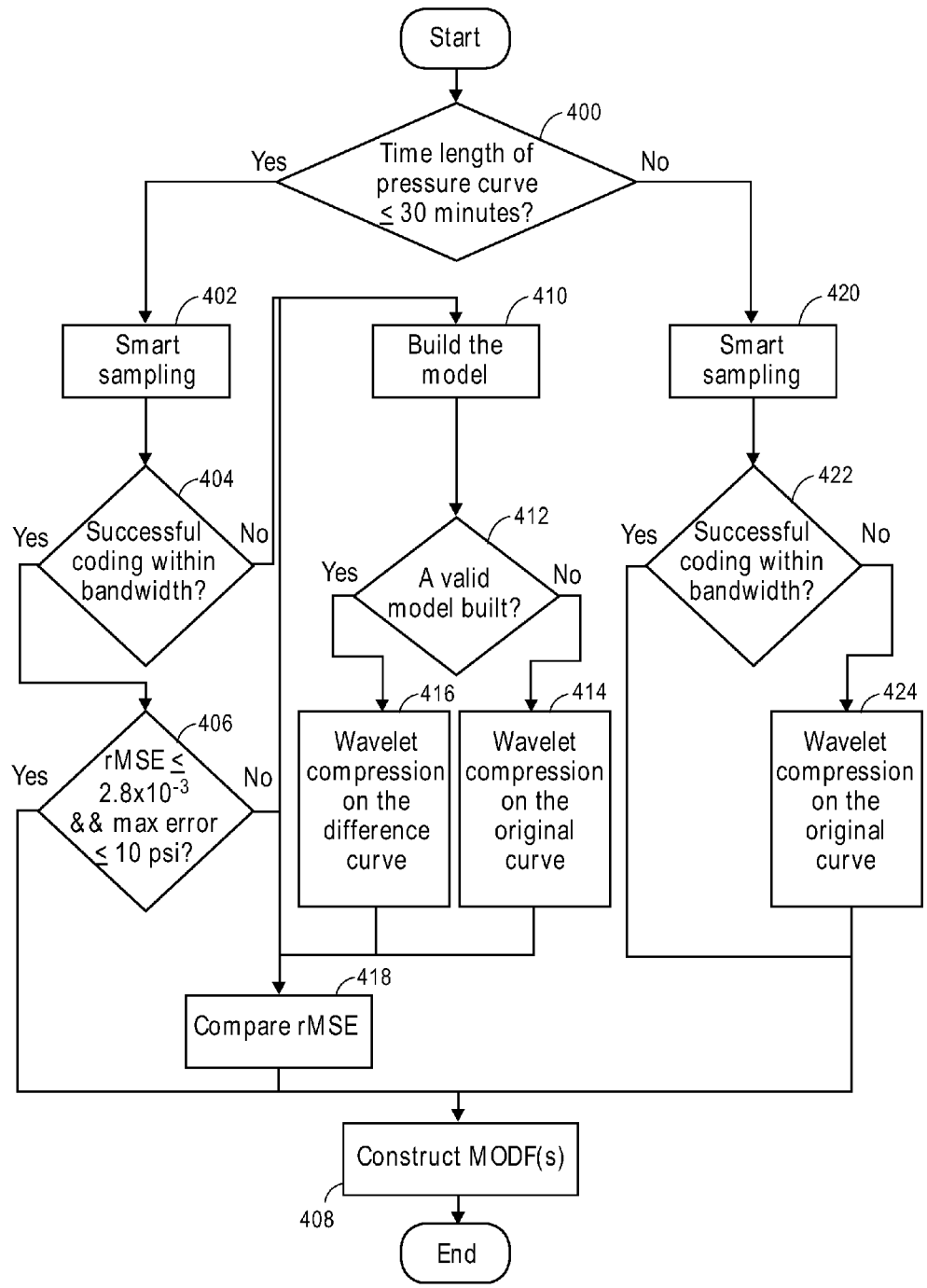
FIG. 4 illustrates another flow chart of selecting a compression algorithm based upon one or more characteristics of the measured pressure data in accordance with an example embodiment of the present disclosure.

FIG. 4 illustrates an example embodiment for selecting a compression protocol based upon the characteristics of the measured pressure data and applying the selected compression protocol to the measured pressure data. For measured pressure data representing a pressure curve having a time characteristic less than or equal to a preselected time interval (Yes from Decision Block 400), the smart sampling compression protocol (Block 402) is applied to compress the measured pressure data. In this example, the preselected time interval is thirty (30) minutes. Yet, the disclosure is not limited by this example. Thus, other time intervals can be used. The relative mean-squared error of the measured pressure data and maximum error of the measured pressure data are then evaluated (Yes from Decision Block 404). If relative mean-squared error is less than or equal to a preselected relative mean-squared error value and maximum error is less than or equal to a preselected psi value (Yes from Decision Block 406), the reconstruction quality of the pressure curve is determined to be acceptable (Block 408). The relative mean-squared error may be defined as the mean energy of the normalized pressure curve, and the maximum error may be defined as the maximum absolute difference between the original curve and the reconstructed curve, which can be evaluated in the time domain. In this example, the preselected relative mean-squared error value is $2.8 \times 10^{-3}$, and the preselected psi value is ten (10) psi. Yet, the disclosure is not limited by this example. Thus, other relative mean-squared error values and psi values can be used. If relative mean-squared error is greater than the preselected relative mean-squared error value or the maximum error is greater than the preselected psi value (No from Decision Block 406), a model-based compression protocol is applied to compress the measured pressure data within a pre-defined bandwidth (Block 410). If the model-building compression protocol fails (e.g., from an atypical pump cycle) (No from Decision Block 412), the direct wavelet compression protocol is applied to the original measured pressure data (Block 414). If a valid model-building is achieved (Yes from Decision Block 412), the direct wavelet compression protocol can be applied to the difference pressure data, as described in greater detail below (Block 416). Then, the compressed pressure data having a lower relative mean-squared error is selected (e.g., the pressure data compressed through the smart sampling compression protocol or the wavelet compression protocol (direct wavelet compression protocol or model-based wavelet compression protocol)) (Block 418) to construct multiple on-demand frames (Block 408).

For a pressure curve greater than the preselected time interval (Yes from Decision Block 400), a pressure integrity test is assumed and the smart sampling compression protocol is applied (Block 420). If the curve exceeds a preselected noise threshold (e.g., indicating an atypical pressure integrity test pressure profile) (No from Decision Block 422), the smart sampling compression protocol may not be able to compress selected samples within the available bandwidth. In these instances, the direct wavelet compression protocol can be selected to be applied to the measured pressure data (Block 424). If the measured pressure data does not exceed the noise threshold (Yes from Decision Block 422), the smart sampling compression protocol is utilized to construct the multiple on-demand frames (Block 408), which is described in greater detail below.

Compression of a Pump-Off Pressure Profile

As described above, the downhole tool 140 measures the pressure data (e.g., annular data) and selects a compression protocol based upon one or more characteristics of the measured pressure data. The selected compression protocol is applied to the measured pressure data and, if acceptable, the compressed pressure data is transmitted to the computing device 138 for generating a pump-off pressure curve based upon the compressed pressure data. The compression protocols are utilized for pump-off pressure profiles during both common pump cycle and pressure integrity test (e.g., leak off tests). Different pressure curves (e.g., a pressure curve related to a common pump cycle and a pressure curve related to a pressure integrity test) can be expected in these scenarios. Additionally, the pressure curves may vary due to different mud types, depths, temperatures, borehole conditions, field operations, and other factors. In order to support the diversity of pump-off pressure curves, three different compression protocols (smart sampling compression protocol, direct wavelet compression protocol, and model-based wavelet compression protocol) are described in greater detail below.

Smart Sampling

Figure 5:
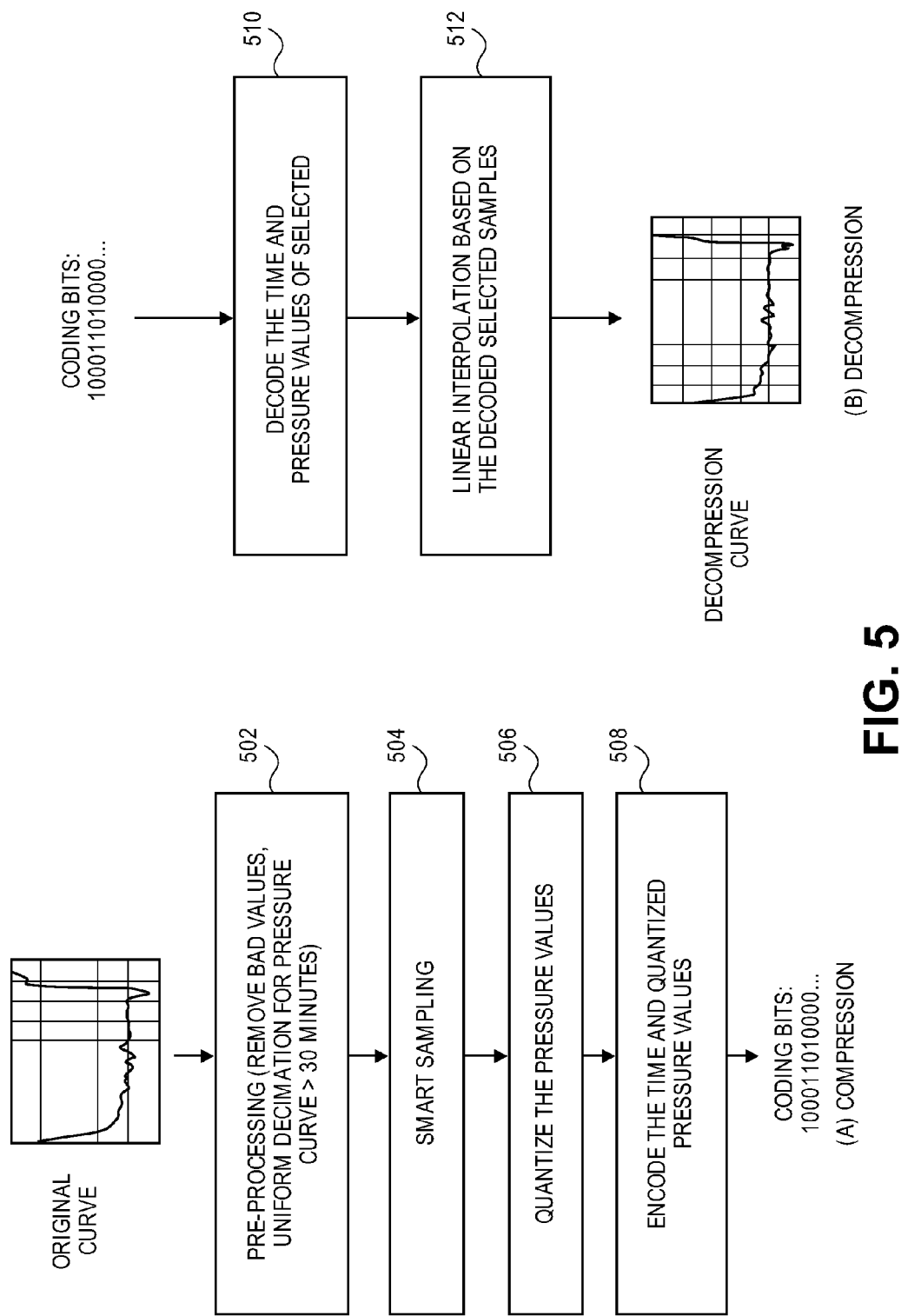
FIG. 5 illustrates a flow chart of compression and decompression of measured pressure data utilizing a smart sampling compression protocol in accordance with an example embodiment of the present disclosure.
Figure 6:
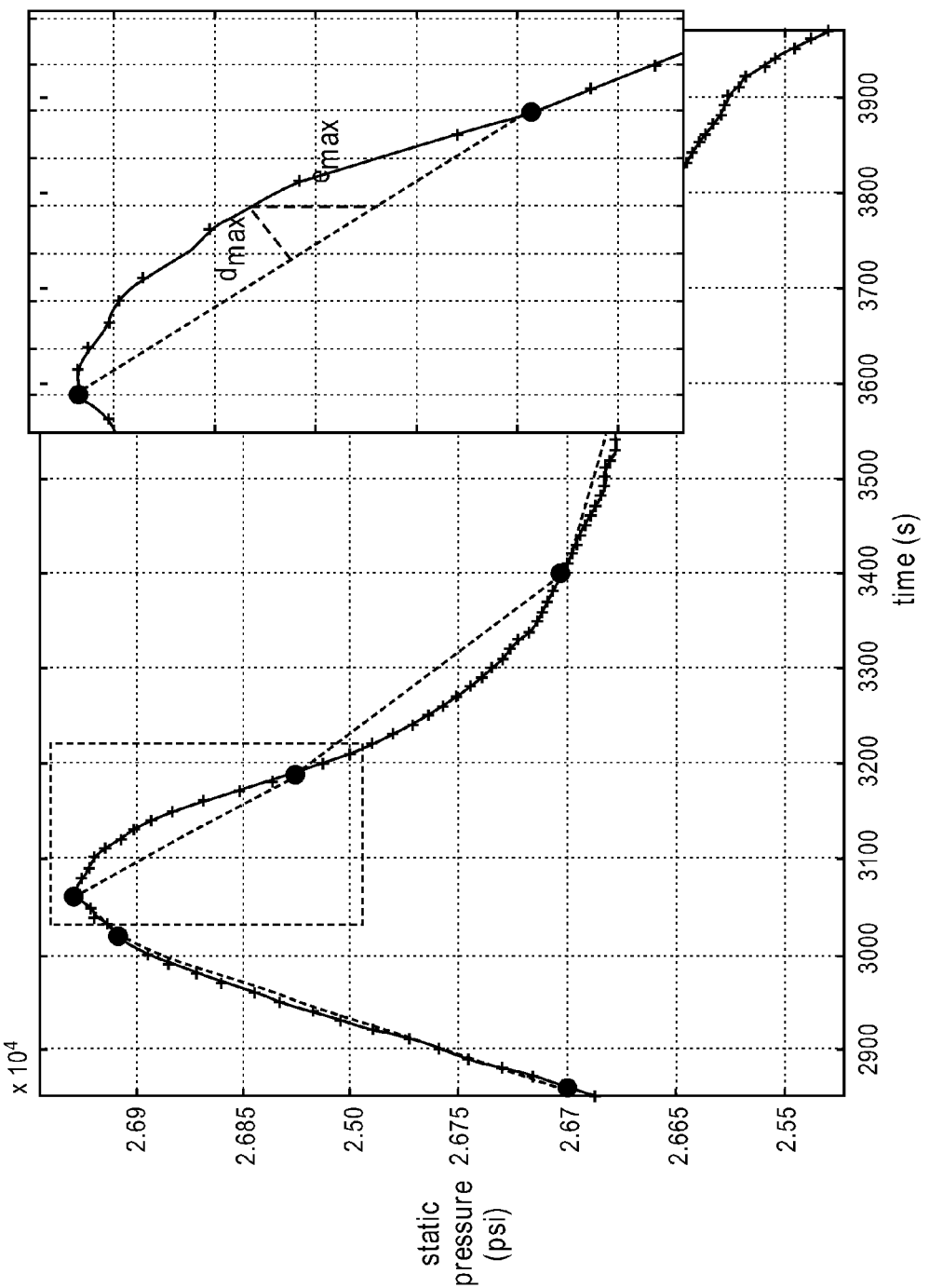
FIG. 6 illustrates a graph of a linear interpolation curve based on a pressure curve in accordance with an example embodiment of the present disclosure.

The compression and decompression for the smart sampling compression protocol are illustrated in FIG. 5. The first step of pre-processing is to remove bad values (Block 502). The upper and lower limits of pressure are set. For example, the upper pressure threshold can be set to equal thirty thousand (30,000) pounds per square inch (psi) and the lower pressure threshold can be set to equal zero (0) psi. Any pressure data values outside of this range can be removed by the controller 144. For bad pressure data values at the boundaries, these pressure data values can be replaced by the nearest good pressure data value (e.g., pressure data values within lower pressure threshold and the upper pressure threshold). For a bad pressure data value occurring within the middle of the pressure curve, a linear interpolation can be applied based upon the two nearest good pressure data values on each side of the bad pressure data value and the bad pressure data value can be replaced by the interpolation point.

Uniform decimation is applied to a pressure curve greater than or equal to thirty (30) minutes in order to reduce the density of data points and simplify the smart sampling process. Uniform decimation with a downsampling rate of $\Delta t_s \approx 16s$ can maintain a shape of a pressure integrity pressure curve. Before the uniform decimation, an anti-aliasing filter may be applied to smooth the pressure curve. In some embodiments, the downsampling rate is set as $\Delta t_s =$round $(16/\Delta t) \cdot \Delta t$, where $\Delta t$ is the raw sampling rate in seconds and a tenth-order finite impulse response low-pass filter with cut-off frequency of $1/(2 \cdot \Delta t_s)$ hertz is sufficient for the anti-aliasing purpose.

A smart sampling compression protocol is applied to select the major points along the pressure curve after pre-processing (Block 504). The coding bitstream is then generated by quantizing the pressure values of the selected samples (Block 506) and encoding the time and quantized pressure values of the selected samples (Block 508).

After the bitstream is received at the computing device 138, compressed time values and pressure data values are decoded (Block 510). For example, the computing device 138 decodes the compressed time values and corresponding pressure data values. The pressure curve is generated (e.g., reconstructed) by linearly interpolating the decoded compressed time and pressure data values (Block 512).

The major points along the pressure curve are selected such that the linear interpolation curve based on these major points is a sufficient match of the pressure curve after pre-processing (see FIG. 5). Three (3) error parameters are defined to measure the errors in the part between two adjacent major points: 1) $e_{max}$: the maximum absolute error; 2) $d_{max}$: the maximum distance; and 3) $\bar{e}$: the absolute value of mean error. Once the three threshold parameters are less than preselected thresholds, the straight line between the two points is used as an acceptable approximation of the corresponding part of the pressure curve. Thus, in one aspect, the smart sampling protocol can select as few as points possible to satisfy the preselected thresholds.

Given a set of error parameters $[e^*_{max}, d^*_{max}, \overline{e^*}]$ and a starting pressure point, the pressure points after the starting pressure point can be measured. For subsequent pressure points, a linear interpolation line between the current pressure point and the starting point can be generated by the controller 144 and the three error parameters can be evaluated. Once the error parameters are within preselected thresholds, the current pressure point can be a candidate sample point to select. This process can continue until any of the error parameters $[1.5e^*_{max}, 1.5d^*_{max}, 1.5\overline{e^*}]$ is exceeded. In some instances, the searching process can terminate when no candidate pressure point is selected within, for example, a thirty (30) minute window. Then, the latest candidate pressure point can be selected as a new sample by the controller 144. After this new sample is set as the new starting point, the above searching method can be applied to locate the next sample. This sampling scheme can stop when the end of the pressure curve is reached.

Note that, in one example, the error parameters $[e^*_{max}, d^*_{max}, \overline{e^*}]$ are not set for the errors at major points and are used to select the major points at which obvious changes in curve slopes can be observed. Different error parameters can be used for different pressure curves. For example, setting the error parameters $[e^*_{max}, d^*_{max}, \overline{e^*}]=[6,3,3]$ can be sufficient to preserve the main trend of a short pressure curve during a common pump cycle. Except for pressure integrity pressure curves that illustrate slow pressure transitions over long time, smaller error parameters $[e^*_{max}, d^*_{max}, \overline{e^*}]=[3,1.5,3]$ can be used to capture the small pressure changes and, thus, locate the major points.

The bandwidth to transmit data in real time can be limited and its upper bound depends on the time length of the pressure curve. The above threshold settings can allow the selected samples to be encoded (e.g., coded) within the allocated bandwidth for most cases. Except for pressure curves that exceed a noise threshold or exceed a pressure variation threshold, too many samples may be selected and the number of coding bits can exceed the bandwidth. A solution is to increase the error parameters and reduce the number of samples. In some embodiments, the three error parameters are increased with certain step sizes until the bandwidth can be satisfied. To lower the complexity, the smart sampling compression protocol with increased error parameter thresholds can be applied to the selected samples in the last step using smaller thresholds.

The controller 144 is configured to determine the upper limits of the error parameters in order to preserve major features in pressure curves. Once the largest thresholds are applied and the available bandwidth is not enough, the pressure curves may not be suitable to be compressed using the smart sampling protocol.

Once the available bandwidth can be met, a refinement process can be used to make use of the bandwidth and code as many major points as possible. In this case, the linear interpolation curve based on the selected samples is generated and compared to the pressure curve after pre-processing. Then, the pressure point with the largest error is added as a new sample and the linear interpolation curve is re-generated. If the mean amplitude error (MAE) is decreased, the updated selected samples can be encoded. Otherwise, the pressure point with the next largest error relating to the previous interpolation curve can be added as a new sample. The new interpolation curve is regenerated and the mean amplitude error is evaluated again. This refinement process of adding samples can continue until the available bandwidth is reached or is exceeded.

Direct Wavelet Compression

Figure 7:
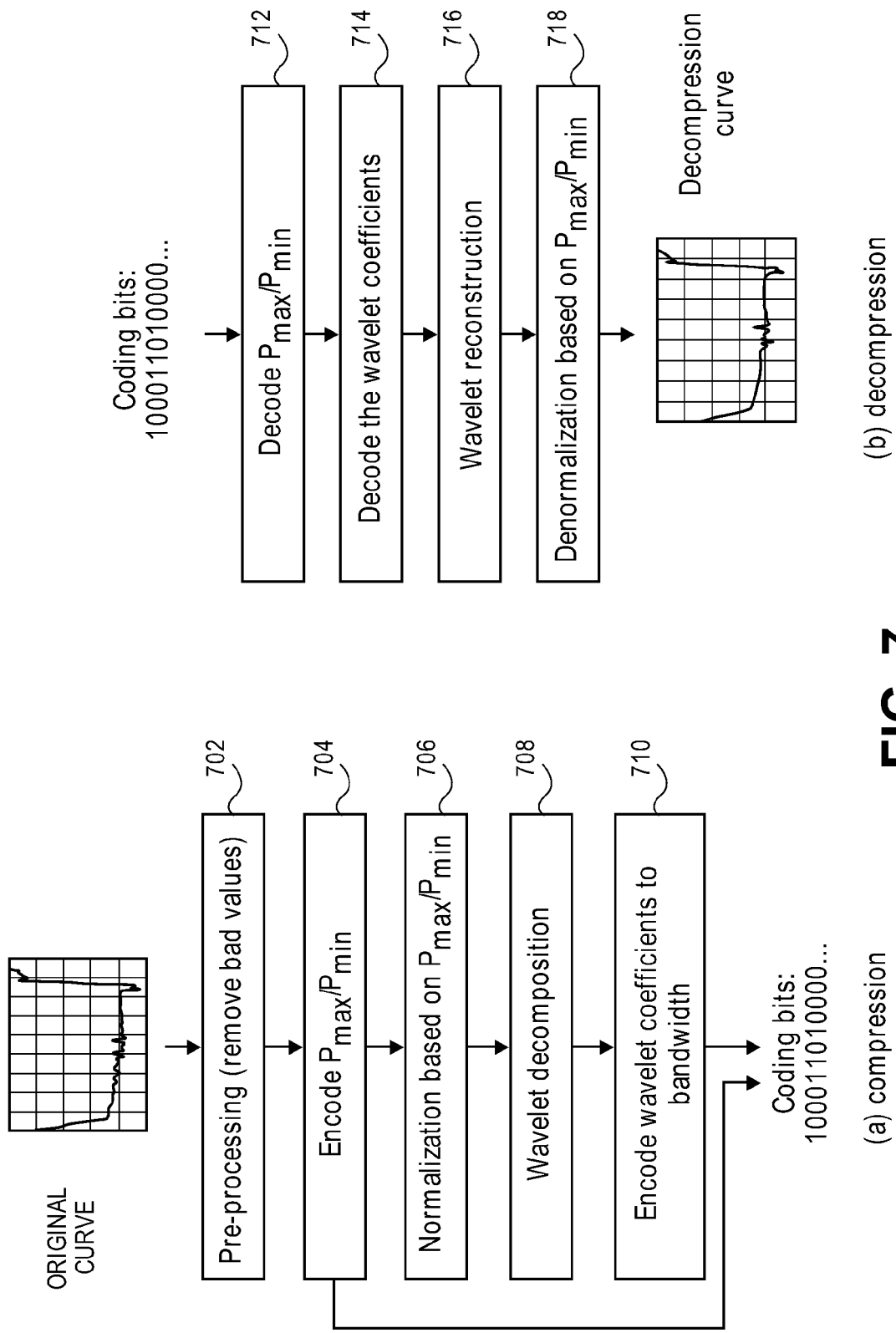
FIG. 7 illustrates a flow chart of compression and decompression of measured pressure data utilizing a wavelet-based compression protocol in accordance with an example embodiment of the present disclosure.

The compression and decompression of the wavelet-based compression protocol are illustrated in FIG. 7. As shown in FIG. 7, the measured pressure data is pre-processed (Block 702). The maximum pressure data and the minimum pressure data are encoded (Block 704). For example, the controller 144 encodes the maximum pressure data and the minimum pressure data. As shown, the pressure data based upon the maximum pressure data and the minimum pressure data is normalized (Block 706) before wavelet decomposition to cover the large dynamic range of pressure value. The normalization and denormalization are shown in FIG. 8. The choice of wavelet type may allow an accurate description of the original pressure curve in time-frequency domain and coding efficiency. For example, the Daubechies-3 wavelet is one example in terms of performance and complexity.

As shown in FIG. 7, in an example embodiment, wavelet decomposition occurs (Block 708). The number of levels for wavelet decomposition can depend on the number of the pressure points. For instance, two criteria can be applied: 1) the number of coefficients in the lowest band is fourteen (14) to twenty-one (21); and 2) if the number of levels is less than four (4) when criterion 1) is met, continue the decomposition to four (4) levels. These criteria can be determined based on experimental results from various data sets.

Figure 9:
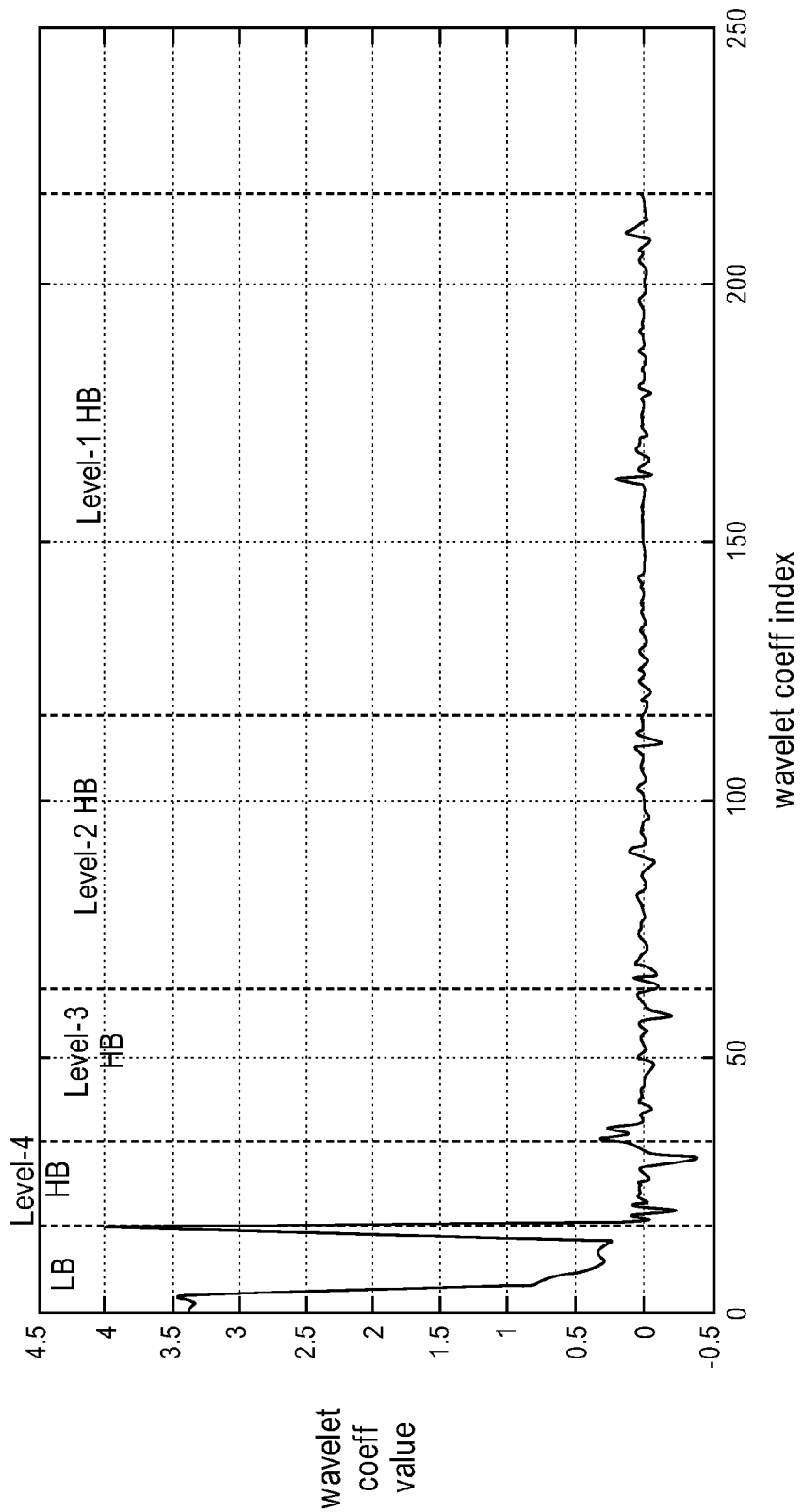
FIG. 9 illustrates a graph of illustrative concatenated wavelet coefficients after a 4-level decomposition in accordance with an example embodiment of the present disclosure.

After wavelet decomposition, wavelet coefficients are encoded (Block 710). For example, a wavelet coefficient sequence is generated by concatenating the bands from the lowest-band to high bands (i.e., the lowest-band, level-L high-band, level-(L-1) high-band, . . . , level-1 high-band) where L is the number of levels for decomposition. One example of concatenated wavelet coefficients after 4-level decomposition is shown in FIG. 9.

As shown in FIG. 7, the maximum pressure data and the minimum pressure data is decoded (Block 712). The next task is to decode the most significant wavelet coefficients within the available bandwidth (Block 714). Typically the significance of coefficients is defined based on their amplitudes: the larger the amplitude, the more significant the coefficient. A reconstruction of the wavelet then occurs (Block 716). As shown, a denormalization based upon maximum pressure data and minimum pressure data is performed (Block 718). For example, the computing device 138 denormalizes the pressure data based upon the maximum pressure data and the minimum pressure data to generate a decompression curve.

Bit-plane (BP) coding can be used in wavelet-based compression protocol. Bit-plane is the array of bits from the wavelet coefficient sequence. FIG. 10 illustrates an example of bit-plane for six (6) coefficients. Bit-plane coding allows as many significant bits in higher layers (e.g., rows) until the available bandwidth is utilized. Thus, the coding process is performed from the most significant bit layer (at $n_{max}$-3 in the example in FIG. 10) to lower layers. In each layer (with a certain n), the coefficients are checked from the left to the right and three kinds of bits are generated: (1) Significance bit: 1 means the corresponding coefficient is significant in this layer (i.e., the bit's magnitude is greater than or equal to $2^n$ and less than $2^{n+1}$) and 0 means it is still significant (e.g., the bit's magnitude less than $2^n$); (2) Sign bit: once a new significant coefficient is located in this layer, the coefficient's sign bit is output as 0 (positive) or 1 (negative); (3) Refinement bit: for coefficients that have already been significant in higher layers (i.e., their magnitude is greater than or equal to $2^{n+1}$), the coefficient's n-th magnitude bits are output as refinement bits to refine their decoded values.

In some embodiments, two sequential search procedures are performed in each layer (with a certain n): (1) Sorting pass: output significance bits and output sign bit for each new significant coefficient; and (2) Refinement pass: output the n-th refinement bits for coefficients that become significant in higher layers.

An example of bit-plane coding scheme is shown in FIG. 11. In this embodiment, the significant bits may have strings of zeros (0s), which motivates the usage of run-length coding for further compression. But the sign bits and refinement bits are random and do not use entropy coding.

The controller 144 is configured to code the wavelet coefficients in the lowest band and higher bands separately. The wavelet coefficients in the lowest band determine the overall shape of the pressure curve. To avoid high distortion, the large lowest-band coefficients are maintained. In some embodiments, a threshold $2^{nlast}$ where $n_{last}=n_{max}-6+1$ is set and the lowest-band coefficients whose magnitudes are larger than this threshold (i.e., 6 highest layers in the bit-plane) can be coded.

Then, the remaining bandwidth can be used by the controller 144 to code the high-band coefficients. Several techniques can be applied to increase coding efficiency: (1) Gain control: the bit-plane can be modified when a gain is applied to the coefficients. This can change the statistical property of the bits after bit-plane coding and adjust the efficiency of the following run-length coding. In some embodiments, multiple gains are applied and the one leading to the lowest mean energy of the normalized pressure curve between the decoded wavelet coefficients and the original ones can be selected. (2) Various run-length coding schemes: In some embodiments, several run-length coding schemes are applied and the one coding the most wavelet coefficients can be used. Note that extra bits are used to indicate the coding scheme selections. (3) The maximum index of significant coefficient: there exists a maximum index of coefficients that can be coded within the bandwidth. After this maximum index is located, coefficients after this index can be ignored so that the coding of their significance bit 0s can be saved. The number of extra bits to code this index is [$\log_2$(total # of high-band coefficients)].

Model-Based Wavelet Compression

Figure 12:
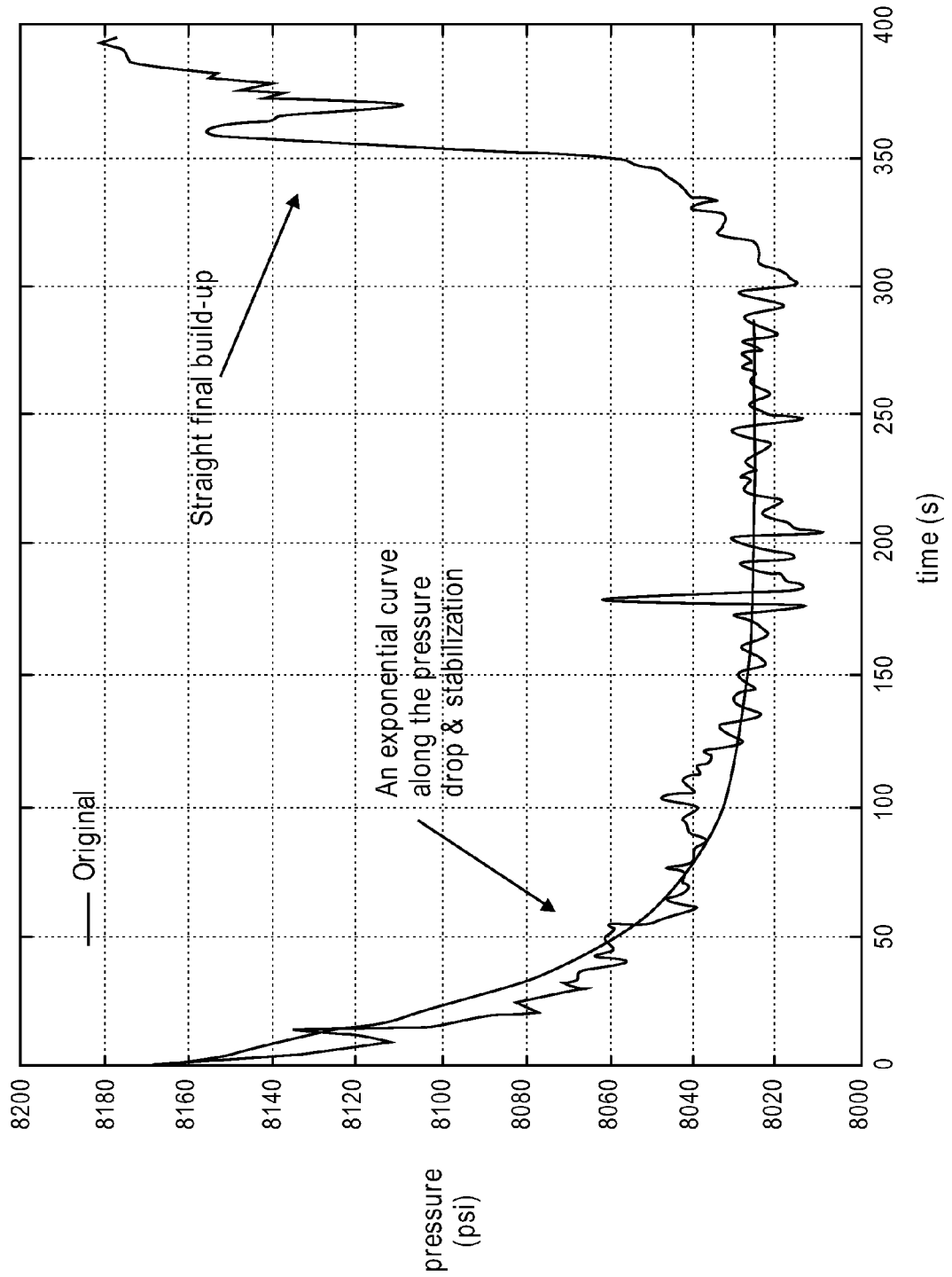
FIG. 12 illustrates a graph of illustrative behavior for the pressure drop and stabilization part and a straight final pressure build-up procedure in accordance with an example embodiment of the present disclosure.

The pressure profile during a common pump cycle can contain three parts: pressure drop after pump-off, pressure stabilization, and pressure build-up after pump-on. Some pressure profiles show that the pressure drop and stabilization behave like an exponential curve and that pressure build-up starts with a straight line and then stabilizes to the annulus pressure, as shown in FIG. 12. Thus, a model can be constructed to illustrate the main trend of the pressure curve, and the main trend can be identified within a difference curve. The difference curve can comprise the difference between the original pressure curve and the model pressure curve. After the contour and details of a pressure curve are decoupled, two separate compression protocols can be applied according to the different data features. Major points can be encoded to reconstruct the model pressure curve. In an embodiment, six (6) major points can be encoded to reconstruct the model pressure curve. For the difference curve, the wavelet-based compression protocol is also applied to preserve the events with large pressure variations.

Figure 13:
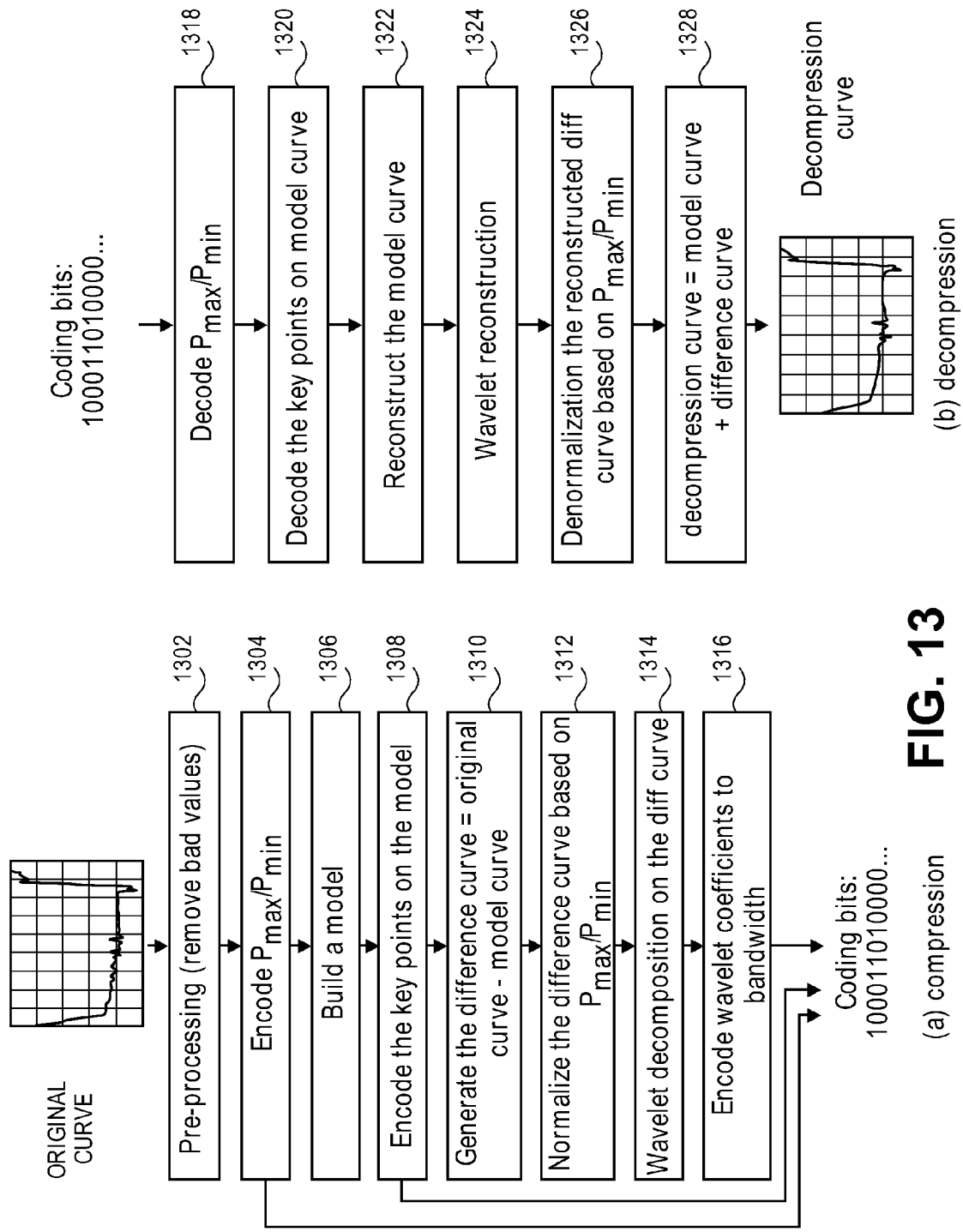
FIG. 13 illustrates a flow chart of compression and decompression of measured pressure data utilizing a model-based wavelet compression protocol in accordance with an example embodiment of the present disclosure.

FIG. 13 illustrates an example model-based compression protocol in accordance with the present disclosure. The measured pressure data is pre-processed (Block 1302), and maximum pressure data and the minimum pressure data are encoded (Block 1304). For example, the controller 144 encodes the maximum pressure data and the minimum pressure data. A model of the measured pressure data is then constructed based upon the encoded maximum pressure data and the minimum pressure data (Block 1306). As shown in FIG. 13, the key points are encoded on the model (Block 1308). A difference curve is then generated (Block 1310). In embodiments, the difference curve comprises the difference between the original pressure curve and the model pressure curve. The difference curve is then normalized based upon the maximum pressure data and the minimum pressure data (Block 1312). For instance, the controller 144 normalizes the difference curve based upon the maximum pressure data and the minimum pressure data. A wavelet decomposition is then performed on the normalized difference curve (Block 1314). The wavelet coefficients are then encoded (Block 1316), and the pressure data is encoded for transmission.

As shown in FIG. 13, the maximum pressure data and the minimum pressure data are decoded (Block 1318). For instance, the computing device 138 receives the compressed pressure data and decodes the maximum pressure data and the minimum pressure data. The key points of the model pressure curve are then decoded (Block 1320). Once the maximum pressure data and the minimum pressure data are decoded and the key points of the model pressure curve are decoded, the model pressure curve is reconstructed (Block 1322) based upon the compressed pressure data. In embodiments, the computing device 138 reconstructs the model pressure curve once the maximum pressure data and the minimum pressure data is decoded and the key points of the model pressure curve are decoded. A wavelet reconstruction is then performed (Block 1324). The reconstructed difference curve is the denormalized based upon the maximum pressure data and the minimum pressure data (Block 1326). The decompression curve is then set to equal to the model pressure curve and the difference curve (Block 1328).

Model Building

Model building allows for the identification (e.g., location) of the final pressure build-up procedure and fit an exponential curve to the pressure drop and stabilization part.

Figure 14:
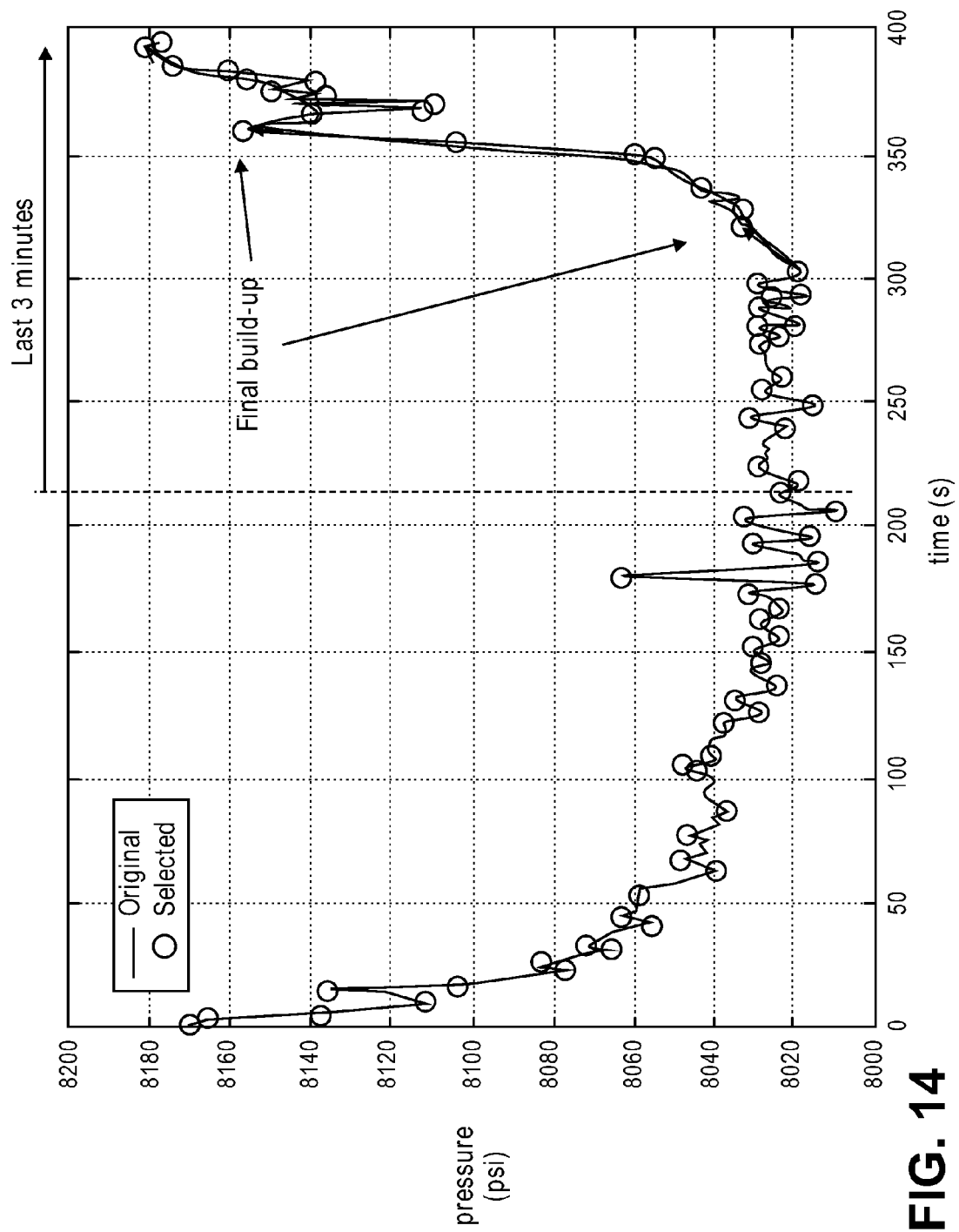
FIG. 14 illustrates a graph of an illustrative pressure build-up procedure in accordance with an example embodiment of the present disclosure.
Figure 15:
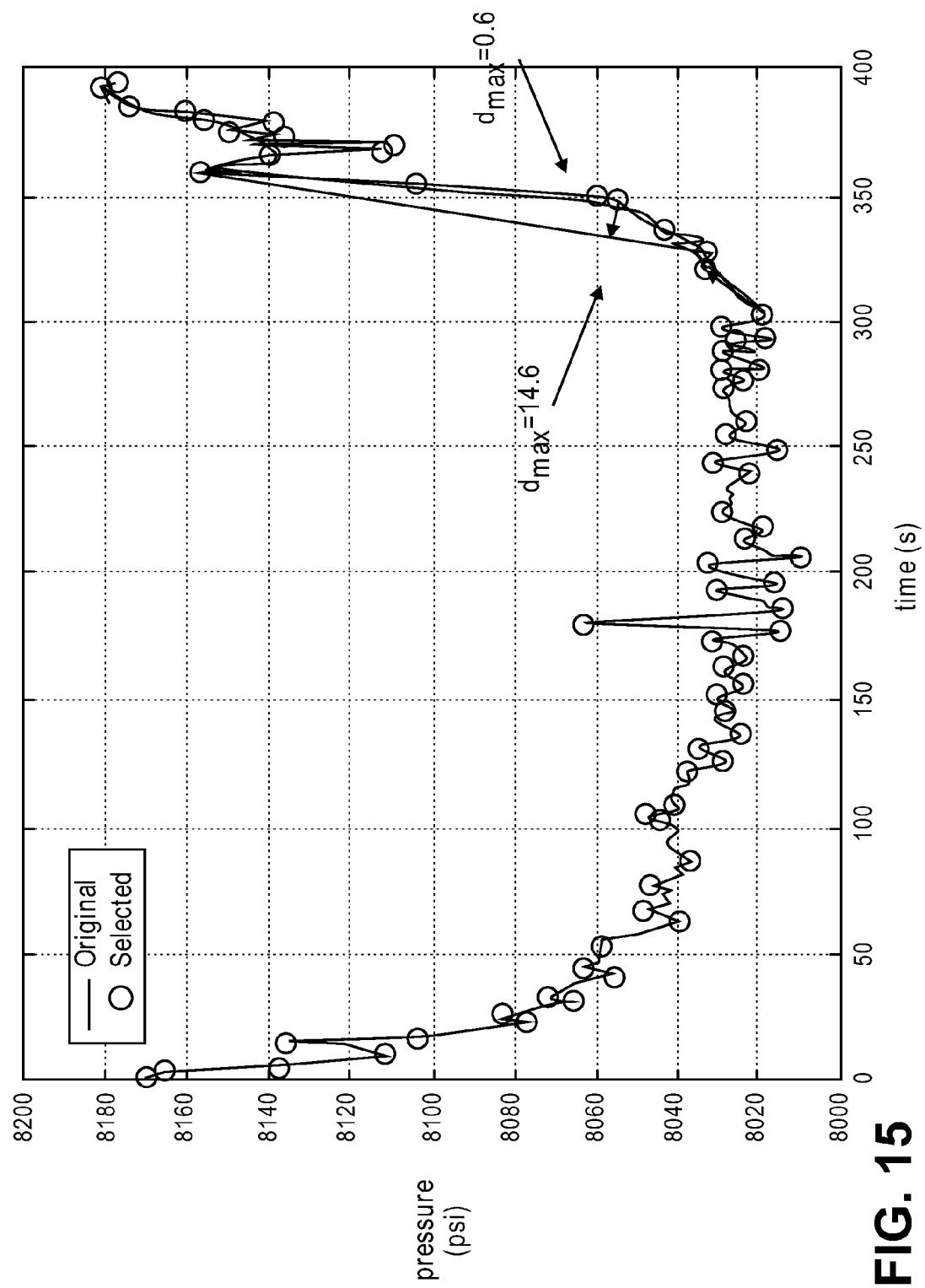
FIG. 15 illustrates a graph of the refinement of the final build-up in accordance with an example embodiment of the present disclosure.
Figure 16:
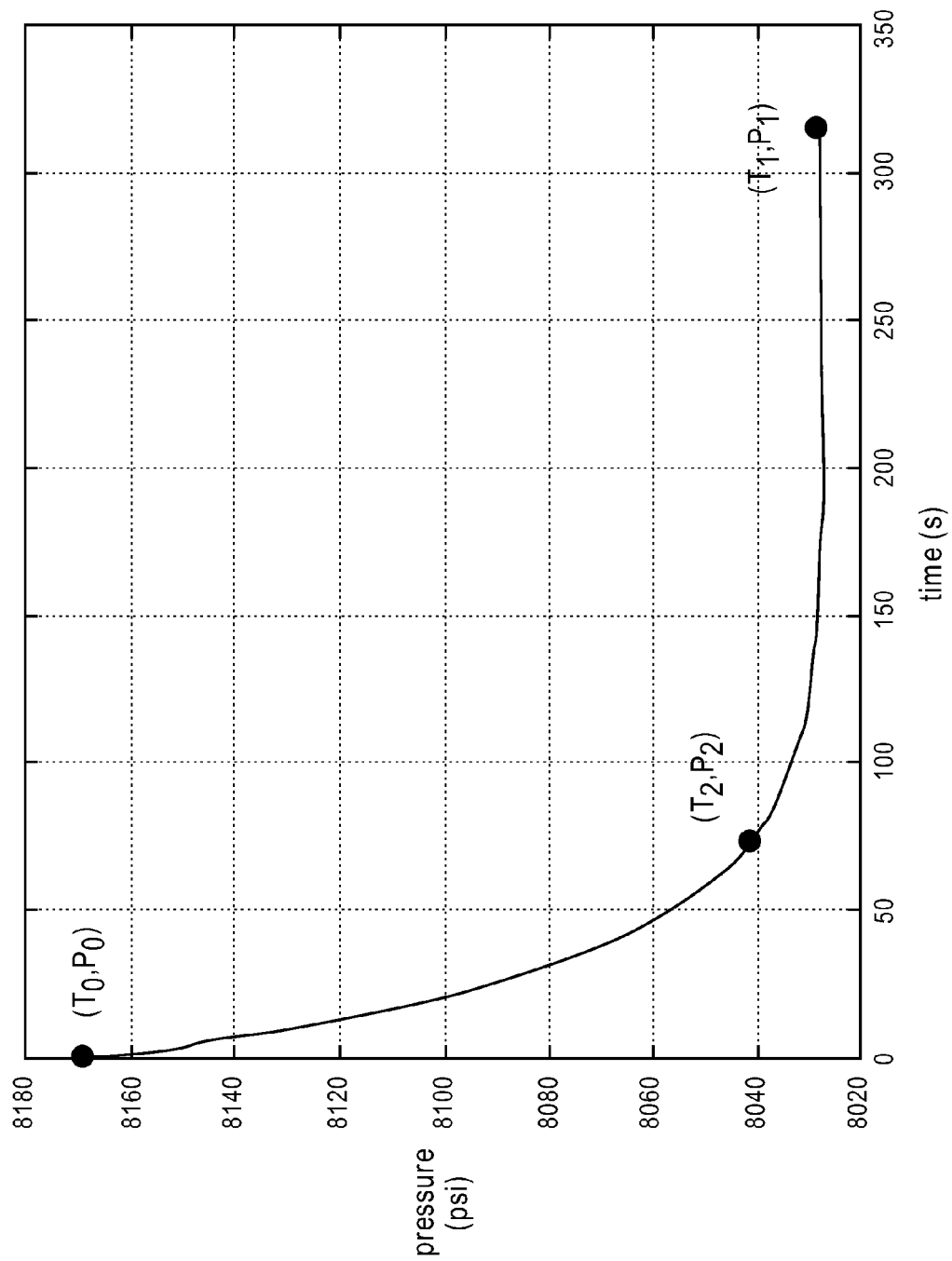
FIG. 16 illustrates an illustrative graph of an exponential curve determined by three points $(T_0, P_0)$, $(T_1, P_1)$, and $(T_2, P_2)$ in accordance with an example embodiment of the present disclosure.

As discussed above, the smart sampling compression protocol can be utilized in locating the build-up procedures because the smart sampling compression protocol provides (e.g., identifies) major turning points along the curve and may remove the noise resulting from small pressure variations. The final build-up can be assumed to happen within a preselected build-up time interval (e.g., three (3) minutes) before the end of the pump-off pressure profile (when pump-on is detected by the controller 144) and continuous pressure increases among the selected samples within the preselected build-up time interval are checked. As illustrated in FIG. 14, the selected samples are shown in circles and potential build-up procedures are indicated by arrows. The largest continuous pressure increase can be selected as the final pressure build-up procedure. In some cases the located build-up procedure is an elbow or curved line, as shown in FIG. 16. The straight line portion with the largest build-up slope indicates the final pressure jump and provides useful information such as fluid compressibility. In some embodiments, the maximum distance from the linear interpolation line to the original pressure curve for the final build-up part (as shown in FIG. 15) is calculated. If the maximum distance is less than a preselected psi threshold (e.g., three (3) psi), the located build-up procedure is assumed to be a straight line. Otherwise, the final build-up is split at the sample with the maximum distance and the part with a larger slope is picked as a new build-up procedure. Then the maximum distance to the original pressure curve is checked again. This splitting process continues until the new final build-up procedure satisfies the threshold and can be treated as a straight line with the largest slope.

The other portion of a model is the exponential curve (denoted as $P(T)=ae^{bT}+c$) starting from the beginning of the pressure curve (denoted as $(T_0=0, P_0)$). To determine the three parameters a,b,c, two more points on the exponential curve have to be determined (i.e., the ending point of the exponential curve $(T_1, P_1)$ and another point $(T_2, P_2)$ in the middle as shown in FIG. 16). Given the three points, the parameters are solved using a dichotomizing method.

Figure 17:
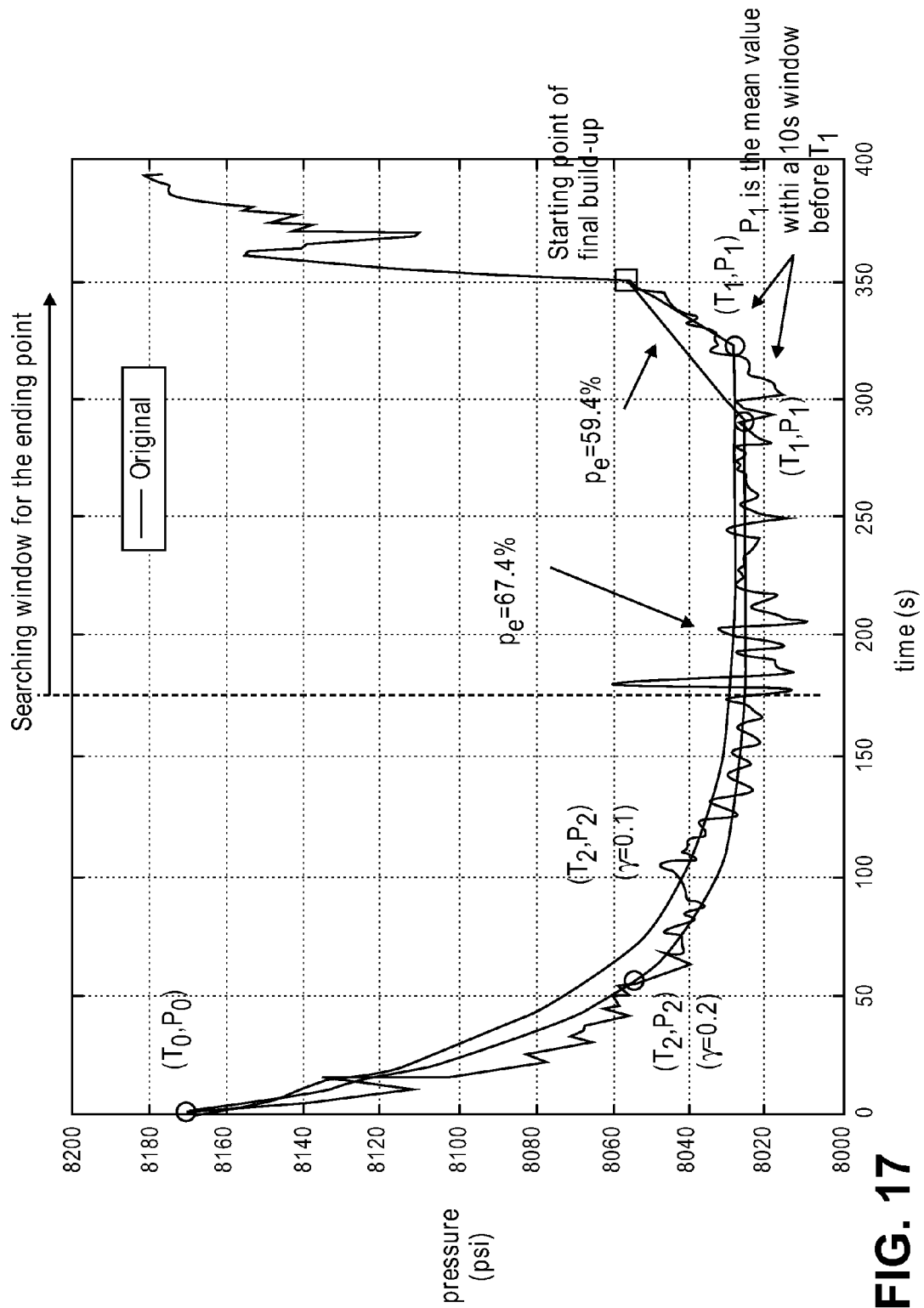
FIG. 17 illustrates a graph of an illustrative model pressure curve generated by concatenating the exponential curve and the straight line between $(T_1, P_1)$ and the starting point of final build-up in accordance with an example embodiment of the present disclosure.

By identifying $(T_1, P_1)$ and $(T_2, P_2)$ on the original pressure curve, a curve fit can be applied to represent the pressure curve. For simplicity, the ending point $(T_1, P_1)$ is searched among the selected samples. The searching window is the second half of the time span from $T_0=0$ to the starting point of the final build-up (as shown in FIG. 16). To alleviate the effect from noise, the mean pressure value within a preselected time interval (e.g., a ten (10) second window) before $T_1$ is computed as $P_1$. For each candidate ending point $(T_1, P_1)$, the middle point $(T_2, P_2)$ is located on the original pressure curve with $P_2=P_1+(P_0-P_1)\cdot\gamma$, where γ less than one (1) is a pre-defined ratio. In some embodiments, γ is set as 0.1 or 0.2. Note that multiple or no valid $(T_2, P_2)$ can be found on the original pressure curve for given $(T_1, P_1)$ and γ. For each set of $(T_0, P_0), (T_1, P_1), (T_2, P_2)$, an exponential curve can be determined. Then a model pressure curve is generated by concatenating the exponential curve and the straight line between $(T_1, P_1)$ and the starting point of final build-up (as seen in FIG. 15). One purpose of modeling is to minimize the number of large values in the different curve and thus favor the compression. A threshold of absolute error e* is set at a preselected error threshold (e.g., three (3) psi) and a quality factor $p_e$ is calculated as the percentage of pressure points on the original pressure curve whose absolute errors to the model pressure curve greater than e*. Among the candidate model pressure curves determined by each set of $(T_0, P_0), (T_1, P_1), (T_2, P_2)$, the one with the lowest percentage $p_e$ can be the final selection. One example of this selection process is given in FIG. 17.

In an example embodiment, to limit the number of candidate $(T_1, P_1)$ and $(T_2, P_2)$ for time saving purposes, up-to a preselected number of pairs (e.g., fifty (50) pairs) of $(T_1, P_1)$ are allowed and given each $(T_1, P_1)$, one candidate $(T_2, P_2)$ can be selected within a preselected time interval (e.g., a sixteen (16) second window).

Figure 18:
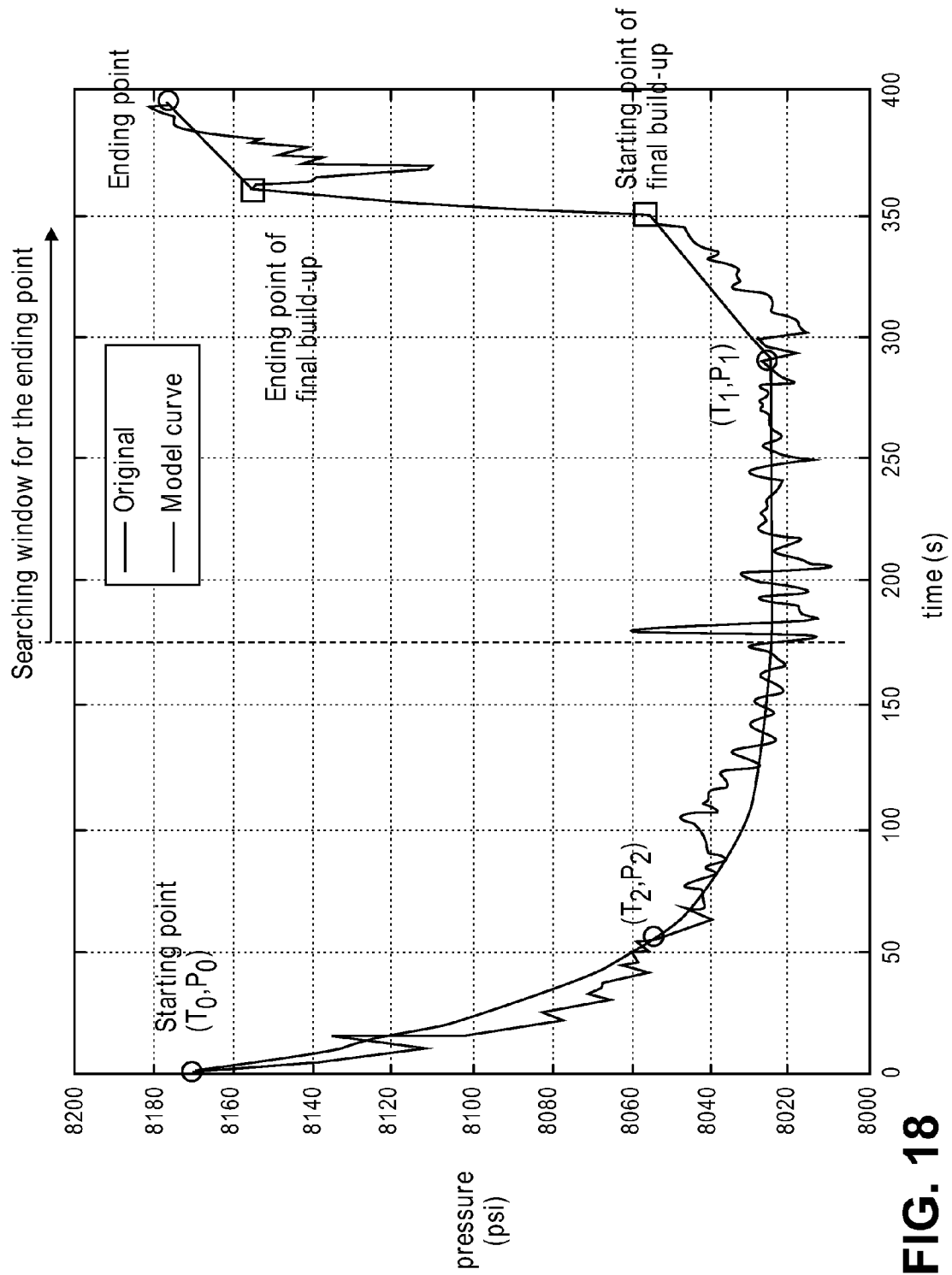
FIG. 18 illustrates a graph of an illustrative final model pressure curve built by concatenating the exponential curve and the straight lines linking $(T_1, P_1)$, the starting/ending points of the pressure build-up, and the ending point of the whole pressure curve in accordance with an example embodiment of the present disclosure.

The final model pressure curve is built by concatenating the exponential curve and the straight lines linking $(T_1, P_1)$, the starting/ending points of the pressure build-up, and the ending point of the whole pressure curve, as shown in FIG. 18. In an example embodiment, six major points (see points in FIG. 18) and the optimal ratio γ can be encoded and transmitted in order to recover this model pressure curve at the decompressor.

Figure 19:
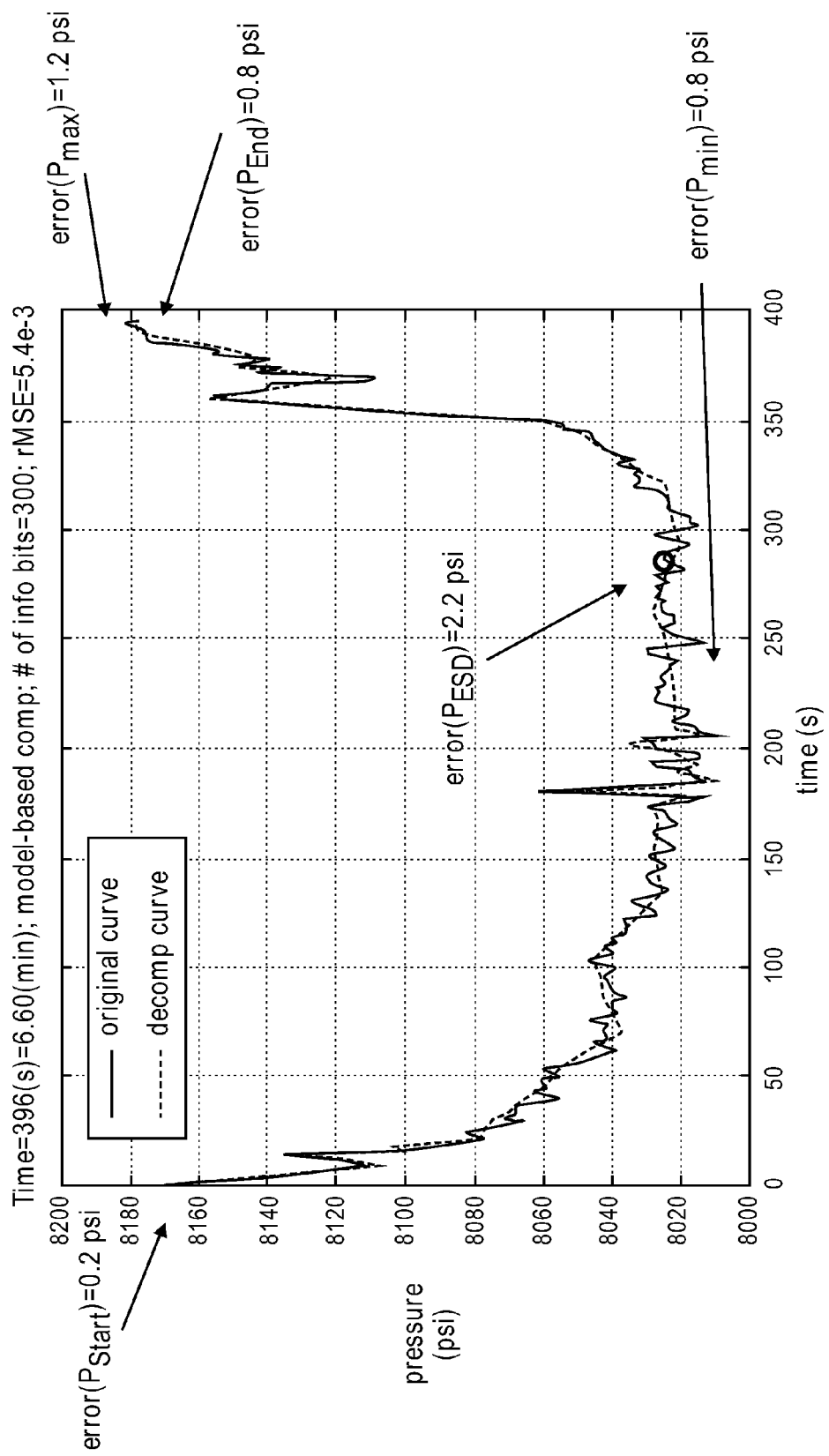
FIG. 19 illustrates a graph showing a pressure curve based upon a model-based compression scheme, where the model-based compression protocol was selected based upon a lower relative mean-squared error in accordance with an example embodiment of the present disclosure.
Figure 20:
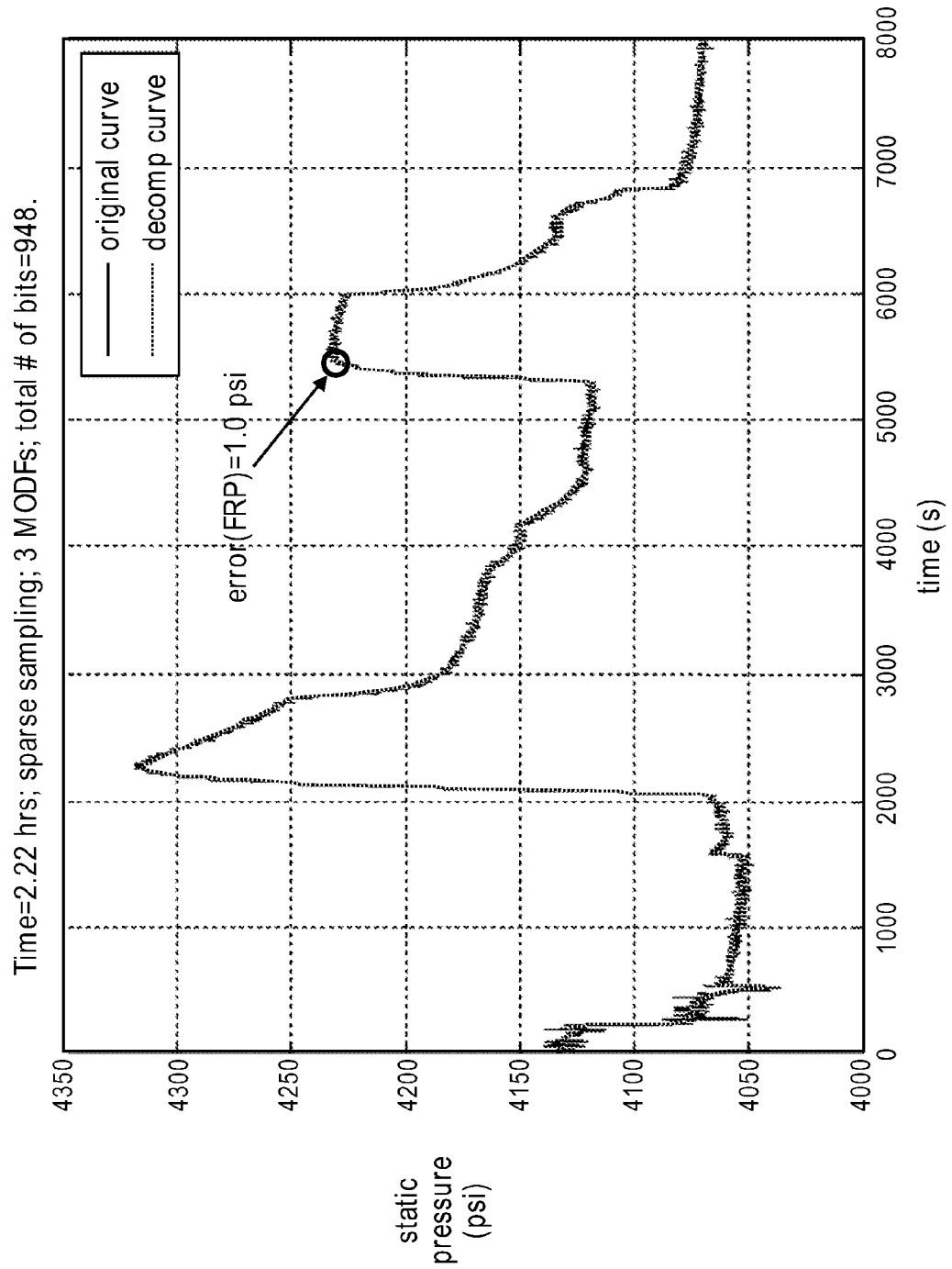
FIG. 20 illustrates a graph showing a pressure curve based upon a smart sampling compression scheme, where the data representing the pressure curve was transmitted in 5.27 minutes at 3.0 b/s.

As shown, FIG. 19 illustrates a graph showing an example pressure curve based upon a model-based compression scheme where the model-based compression scheme was selected based upon a lower rMSE, and FIG. 20 illustrates an example graph showing a pressure curve based upon a smart sampling compression scheme, where the data representing the pressure curve was transmitted in 5.27 minutes at 3.0 b/s.

Compressing the Difference Pressure Curve

In some embodiments, the difference between the original pressure curve and the model pressure curve can be compressed using the direct wavelet compression protocol as described above. In these embodiments, one or more modifications may be incorporated into the direct wavelet compression protocol in order to obtain a more accurate representation of difference pressure curve. As a first example, the controller 144 may use zero-padding instead of symmetric-padding as the extension scheme for wavelet decomposition. The model pressure curve preserves the boundary portions of the pressure curve so that the symmetric extension is not necessarily used to alleviate the boundary artifacts due to the compression protocol. The zero-padding scheme can generate less wavelet coefficients around the boundaries in respective bands to improve coding efficiency. In a second example, the controller 144 can code lowest-band and high-band coefficients together as the main trend of the original pressure curve has been sufficiently represented by the model pressure curve. In a third example, the controller 144 can apply a particular gain on high-band coefficients.

In some instances the difference between the magnitudes of lowest-band coefficients and high-band coefficients is apparent. If the controller 144 codes the coefficients together, a number of significance bit zeros (0s) for the high-band coefficients may need to be coded in first several bit-plane layers. A solution may be to apply a particular gain to the high-band coefficients to modify the respective magnitudes. (4) The controller 144 may also apply bit-plane coding without selecting the largest coefficients. In the direct wavelet compression protocol described above, the largest coefficients in magnitudes are selected to be coded in order to preserve the major features with large pressure variations (such as the pressure drop at the beginning, the pressure build-up, etc). As a result, selecting the largest coefficients in magnitudes to be coded may not necessarily be used when compressing the difference curve because the model pressure curve has already captured these major features, which allows sorting of the wavelet coefficients to be avoided.

Transmission of Real-Time Pump-Off Pressure Profile

The compressed pressure data representing the pump-off pressure profile (e.g., curve) can be sent utilizing multiple on-demand frames (MODFs) after pumping resumes. The transmission of multiple on-demand frames can be initiated by controller 144 of the dowhole tool 140 after compression of the measured pressure data as described above. Multiple on-demand frames of various lengths can be utilized to support a variety of pressure curves. Moreover, the multiple on-demand frame design allows the sending of data packages (dpoints) from other tools to allow updating rates for other measurements (e.g., the tool face).

The MODF Designs

Figure 21:
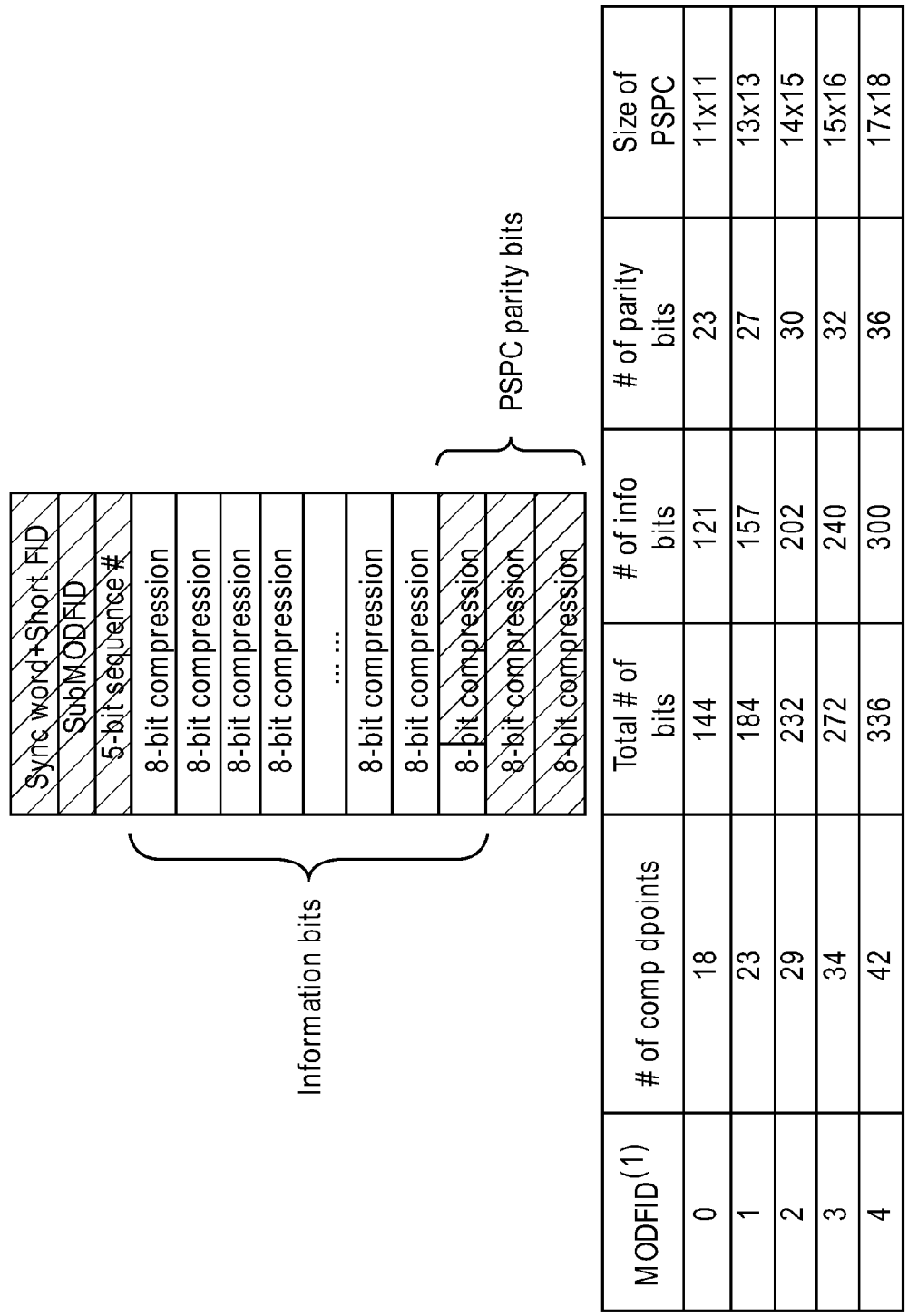
FIG. 21 illustrates five (5) multiple on-demand frame (MODFs) of different lengths in accordance with an example embodiment of the present disclosure.

Multiple on-demand frames (MODFs) of different lengths are described in this disclosure and are shown in FIG. 21. In an embodiment, respective multiple on-demand frames include the synchronization word+short frame ID (FID) (which can be combined as one dpoint) and a twelve (12) bit SubMODFID. Four (4) bits in SubMODFID can be used to identify up to sixteen (16) multiple on-demand frame designs and the extra eight (8) bits are parity bits for error protection. In an embodiment, sixteen (16) multiple on-demand frame designs can be shared by the tools in a bottom hole assembly 116. The next five (5) bit dpoint are utilized as the sequence number to identify the position of the current multiple on-demand frame in the multiple on-demand frame sequence. Operators of the wellsite system 100 can initiate communication with the downhole tool 144 to request the retransmission of a missing multiple on-demand frame by specifying the respective sequence number.

The following array of eight (8) bit dpoints can be used to hold the compression (information) bits for the pump-off pressure data and the error correction parity bits. The compression scheme discussed above may be sensitive to errors as one bit error may disrupt the decompression process. To reduce transmission errors (0.3% bit error rate in common mud-pulse telemetry conditions), a product single-parity check code (PSPC) can be utilized. In some embodiments, the product single-parity check utilizes about fifteen percent (15%) overhead as compared to multiple on-demand frames having no product single-parity check. However, the product single-parity check provides sufficient error correction performance. In the multiple on-demand frame configurations, the parity bits of product single-party check are appended to the end of each frame, as shown in FIG. 20.

Bit Allocation and Construction of MODFs

One or more bits of the multiple on-demand frames can be utilized to compress longer pressure curves. Moreover, pressure curves with variations may utilize additional bits as compared to pressure curves having lesser variations. In an embodiment, the number of information bits is allocated based on the time length characteristic of pressure curve and the relative mean-squared error characteristic.

FIG. 22 illustrates an example bit allocation for pressure curves of various lengths and the candidate multiple on-demand frame(s) to transmit the compression bits. In some embodiments, five (5) multiple on-demand frame configurations may be utilized according to one or more characteristics (e.g., the time characteristic, etc.) of the pressure curve For a pressure curve less than or equal to thirty (30) minutes, the candidate multiple on-demand frames with different numbers of information bits can be applied to compress the pressure curve and the shortest multiple on-demand frame (e.g., multiple on-demand frame having the least amount of bits) having a relative mean-squared error less than or equal to 0.2% can be selected to transmit the compressed pressure data. The threshold on relative mean-squared error is set as 0.2% because the statistical study indicate that the reconstruction curves with relative mean-squared error less than or equal to 0.2% are acceptable in most cases. In an embodiment, if relative mean-squared error is greater than 0.2% for the largest multiple on-demand frame(s), the largest multiple on-demand frame(s) can be used to transmit the compressed pressure data.

For a pressure curve greater than thirty (30) minutes, (pressure curves having a timing characteristic of up to eight (8) hours), an upper limit on the number of compression bits is simply set proportionally to the time-length of the pressure curve (e.g., two hundred (200) bits per fifteen (15) minute data). If the smart sampling compression protocol is used, in most cases the selected samples using the initial thresholds can be coded within the maximum bandwidth. Otherwise, the thresholds can be increased to reduce the selected samples until the maximum bandwidth is sufficient. If the direct wavelet compression protocol is used, the maximum number of compression bits can be used. Then the compression bits can be encapsulated into a sequence of multiple on-demand frames for transmission. It is understood that the number of possible sequences can be increased exponentially with the length of the pressure curve. In some embodiments, the longest multiple on-demand frame design (MODFIO=4) can be used at the beginning in the MODF sequence in order to reduce the percentage of overhead (synchronization word, short FID, SubMODFID, and PSPC parity bits). For the last multiple on-demand frame in the sequence of this embodiment, the five multiple on-demand frame configurations can be tried and the shortest multiple on-demand frame that can hold the compression data can be utilized, which allows for a reduction in the total length of the multiple on-demand frame.

Figure 23:
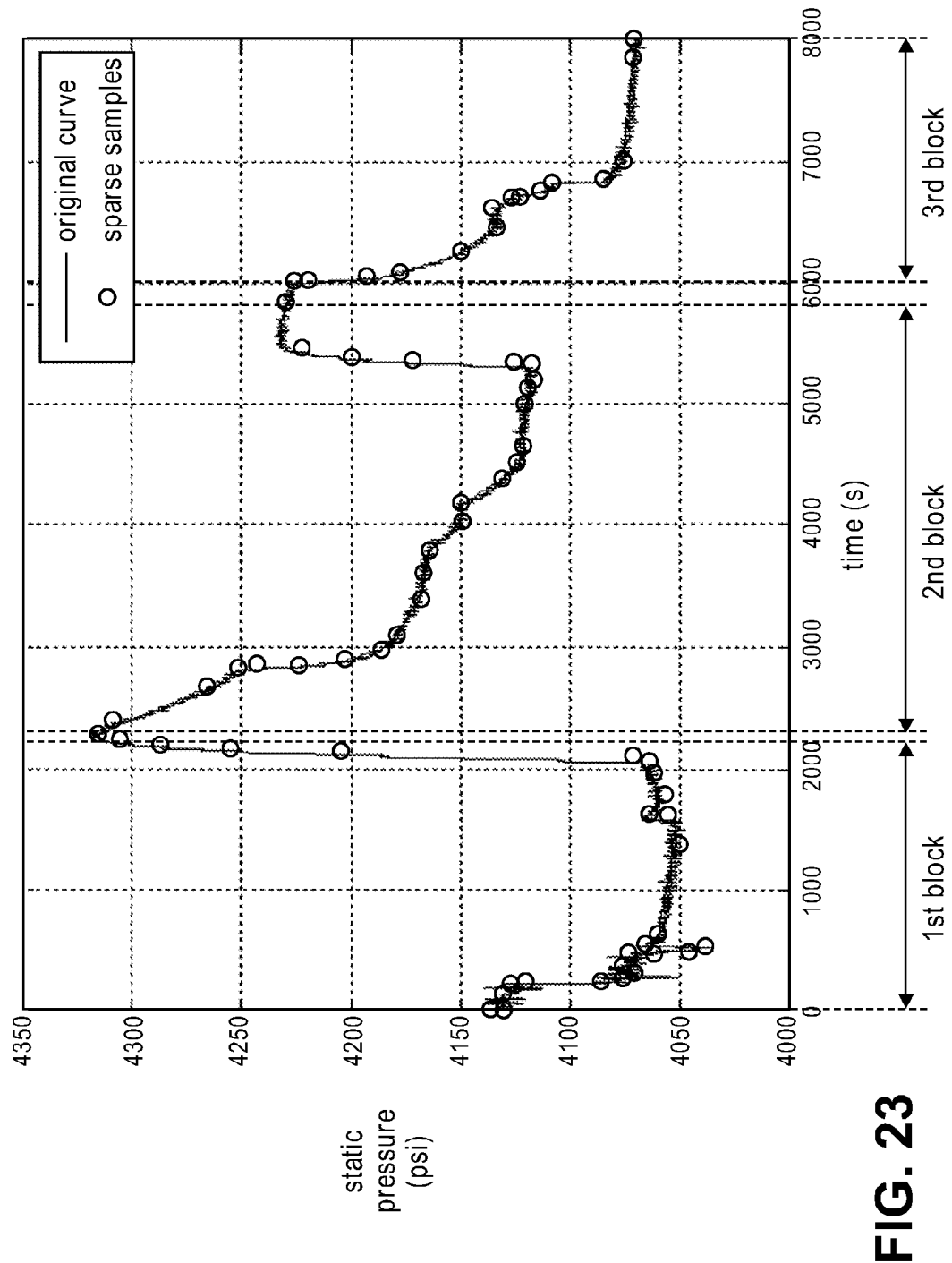
FIG. 23 illustrates a graph showing the pressure curve transmitted in blocks in accordance with an example embodiment of the present disclosure.

FIG. 23 illustrates an example to transmit the pressure curve in blocks using multiple on-demand frames. In this example, the pressure curve is about 2.22 hours. The upper limit of bandwidth is about one thousand seven hundred and seventy-six (1,776) bits (e.g., (200×2.22×4)=1,776 bits). The smart sampling compression protocol, using the initial error parameters, can generate seventy (70) samples. In this example, the first two multiple on-demand frames with MODFID=4 can encode 30/25 samples in time spans of 36.8/59.5 minutes, respectively. The third multiple on-demand frame with MODFID=2 is sufficient to encode the remaining 15 samples. The total number of compression (information) bits is seven hundred and twenty-eight (728), which is lower than the upper limit one thousand seven hundred seventy-six (1,776), so the compression process completes and these three multiple on-demand frames are used to transmit three blocks of the pressure curve. The block size is variable according to the local feature in each block and the size of assigned multiple on-demand frames. Each block can be decoded independently if the first sample in the block is used as references for both pressure and time. In some embodiments, extra bits are used to code the reference pressure (instead of the pressure difference) and the reference time.

The independent decoding of multiple on-demand frames may be valid when a pressure curve greater than thirty (30) minutes is compressed by the smart sampling compression protocol. For example, if the direct wavelet compression protocol is used, the curve can be compressed and the coding bits can be encapsulated into a sequence of multiple on-demand frames for transmission.

Transmission of MODF(s)

Figure 24:
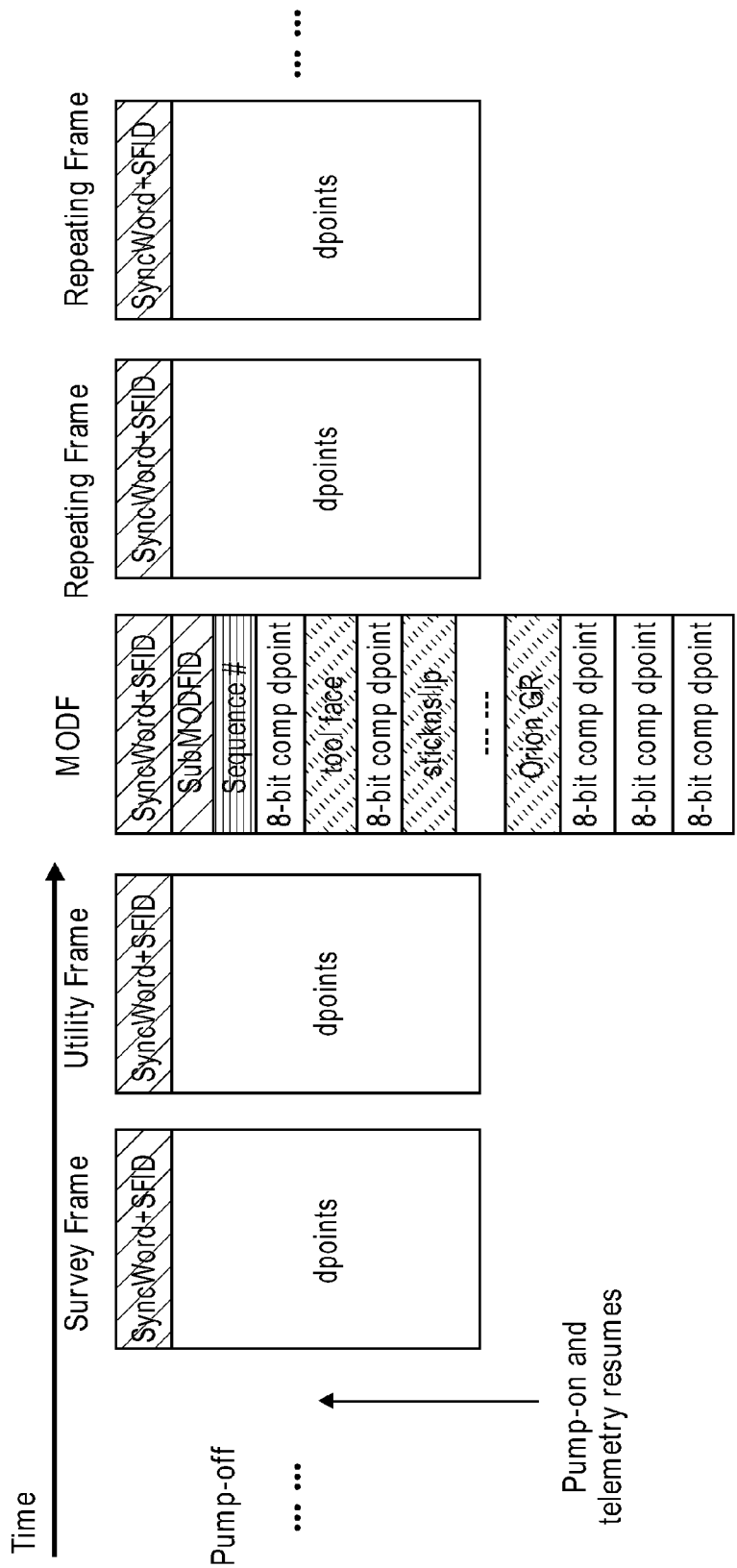
FIG. 24 illustrates the transmission of multiple on-demand frame for pump-off pressure in accordance with an example embodiment of the present disclosure.
Figure 25:
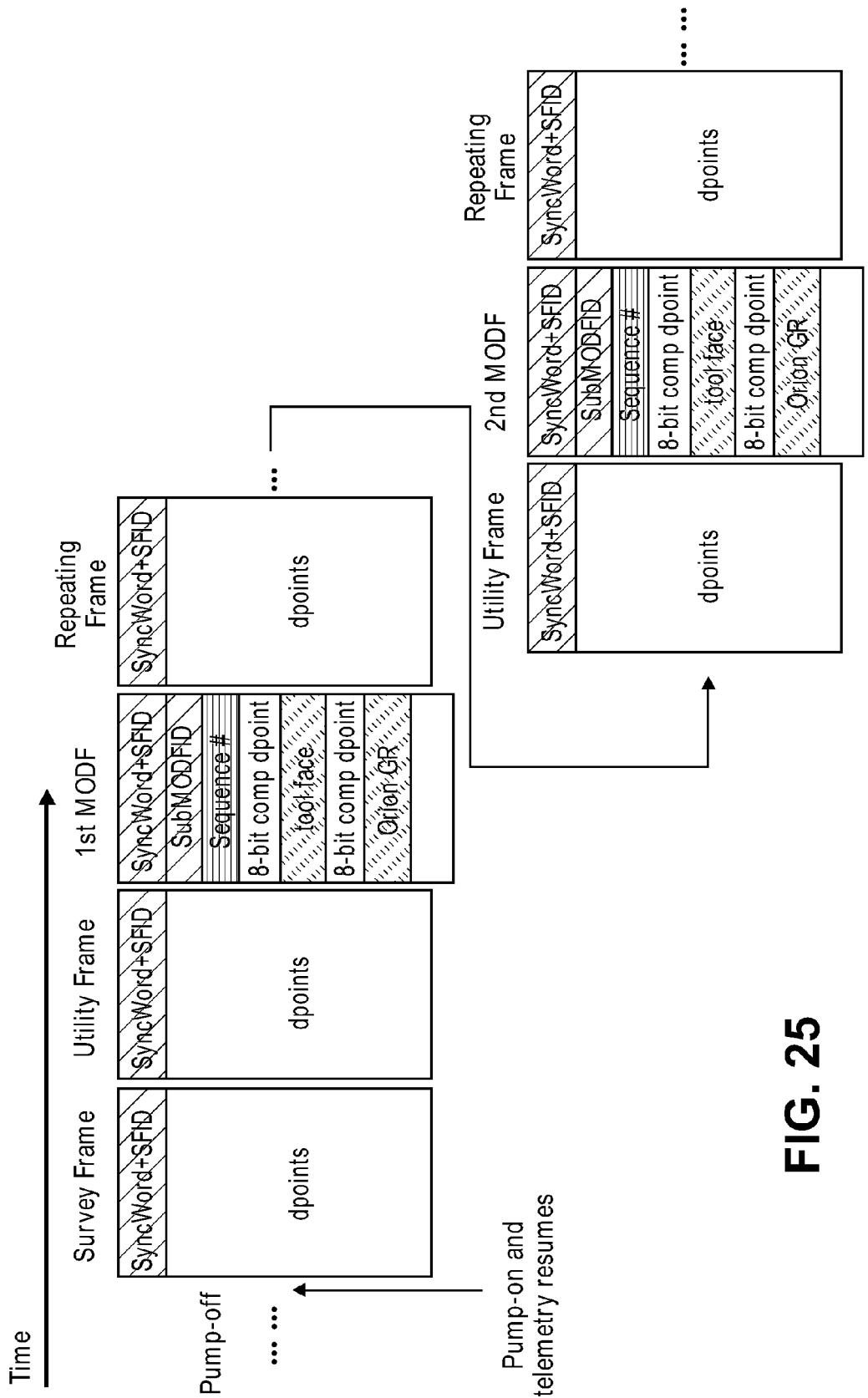
FIG. 25 illustrates an illustrative case of a sequence of multiple on-demand frames in accordance with an example embodiment of the present disclosure.

Respective multiple on-demand frames can be transmitted following the survey and utility frame after telemetry resumes, as shown in FIG. 24. FIG. 25 illustrates a sequence of multiple on-demand frames transmitted uphole. The multiple on-demand frames and repeating frames can be sent in an interleaving manner and the dpoints in repeating frames can be used to fill the gaps caused by the transmission of each multiple on-demand frames. The length of repeating frames between adjacent multiple on-demand frames may be programmable in order to adapt with various telemetry speeds.

Data Extension

Two-Step Compression

As discussed below, in the event of discontinuous pressure curves, extension pressure data can be appended to the transmitted data to provide a continuous pressure curve profile. For example, extension pressure data can be included around the pump-off annular pressure while drilling data during the pump-down/pump-up transition periods allowing a continuous log (a real-time log) of pump-off and pump-on annular pressure while drilling to be produced. A field user can configure the extension time lengths for both sides of the measurement of interest according to the job requirements. Extension pressure data around the pumps-off annular pressure while drilling data of interest can be appended to allow continuous annular pressure while drilling time logs since no annular pressure while drilling data may be available during the transition periods of pumps-up/down. The extension pressure data time length can be from about one (1) minute to about ten (10) minutes before pumps-down and from about one (1) minute to about four (4) minutes after pumps-up. However, it is understood that other extension pressure data time lengths can be utilized according to the project.

Figure 26:
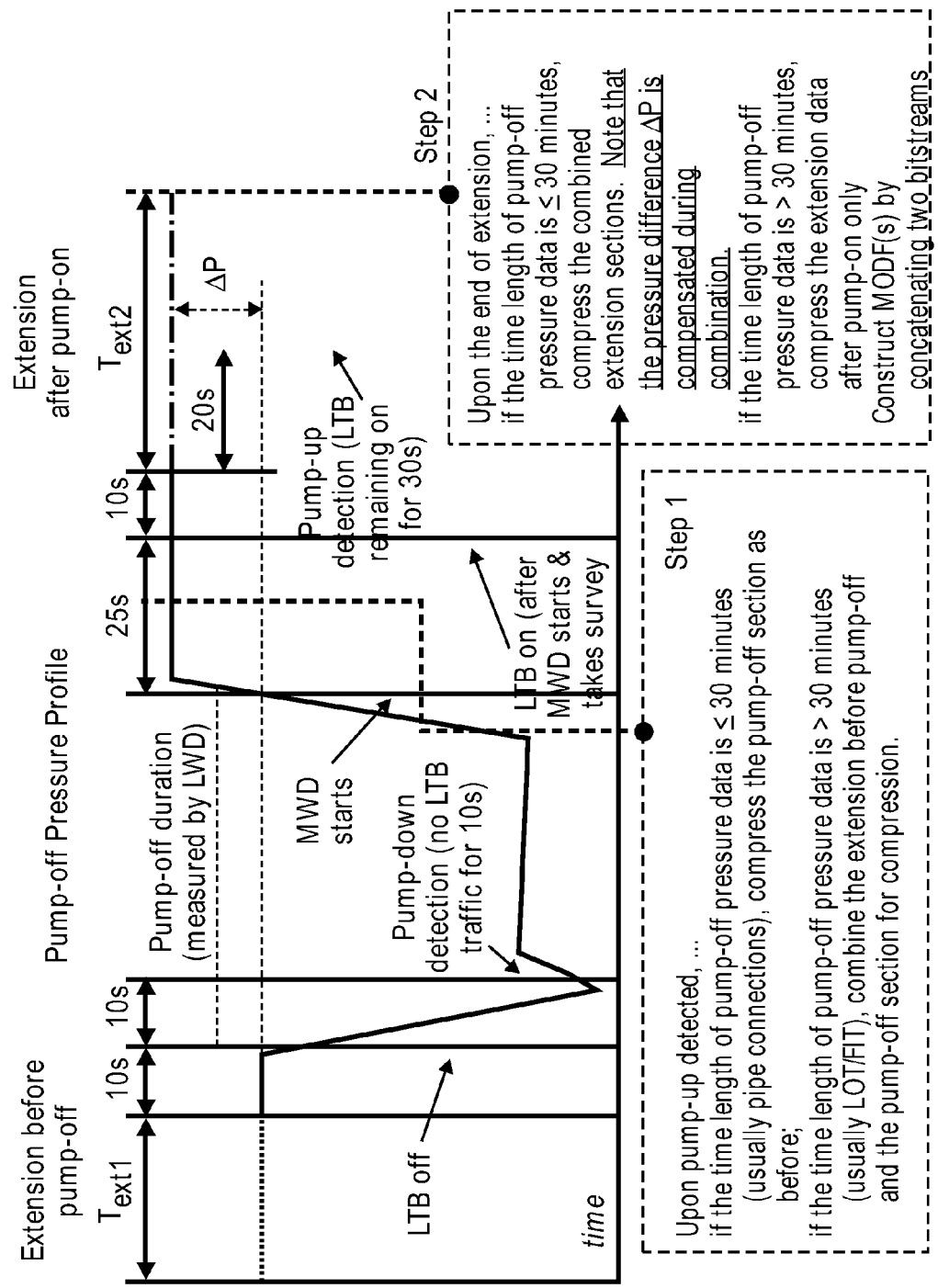
FIG. 26 illustrates a two-step compression protocol for extension data in accordance with an example embodiment of the present disclosure.

As shown in FIG. 26, a two-step compression process can be utilized to append extension pressure data to the measured pressure data. The pumps-off annular pressure while drilling data is compressed after the downhole tool 140 detects a pumps-up transition period and a sequence of multiple on-demand frames is generated corresponding to the compressed pressure data. The extension pressure data (e.g., extension pressure data) is then compressed after the transition period terminates, and the compressed extension pressure data is embedded (e.g., encoded) into the aforementioned multiple on-demand frame.

Compression of Extension Pressure Data

Figure 27:
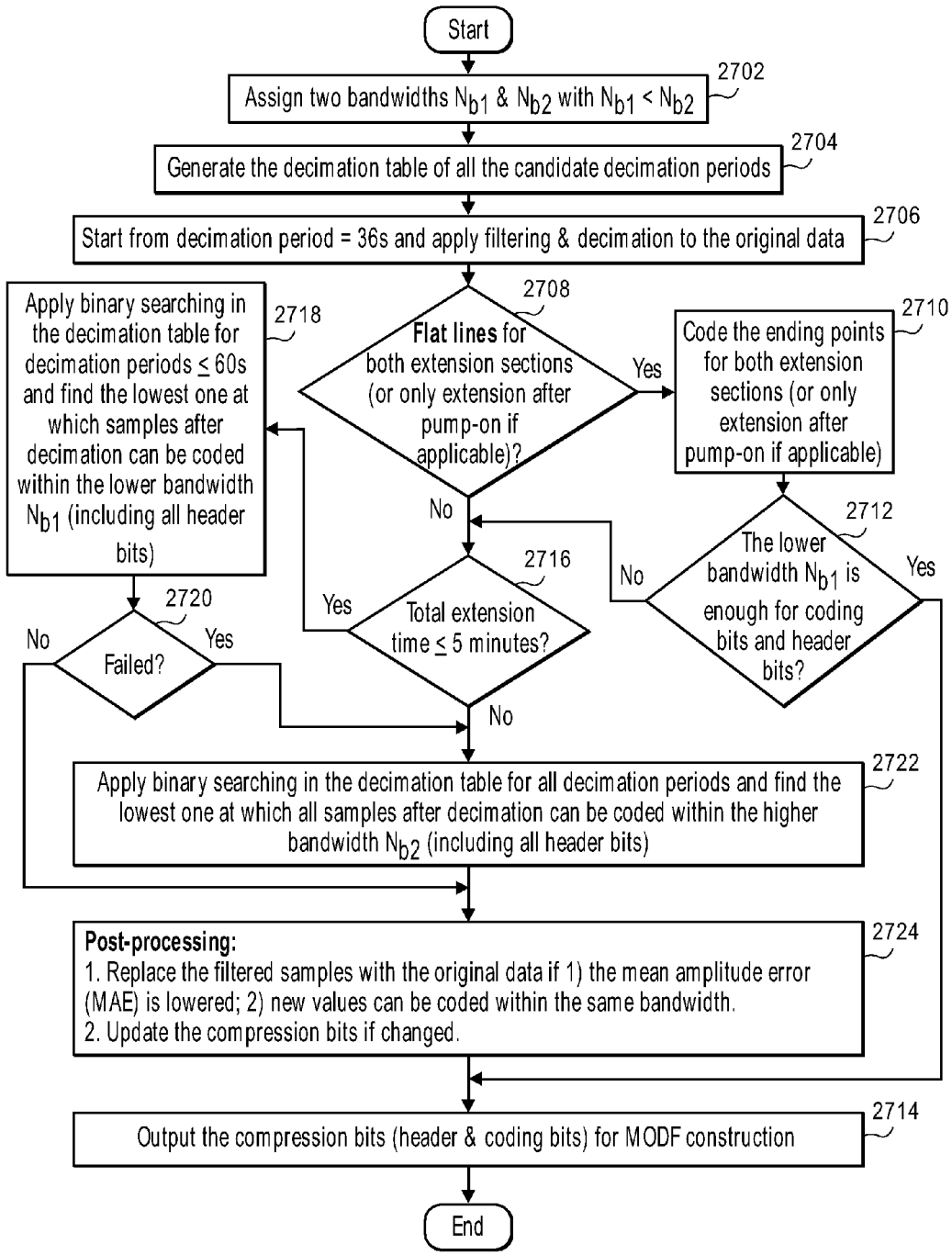
FIG. 27 illustrates a flow chart showing the two-step compression protocol for extension data in accordance with an example embodiment of the present disclosure.

An adaptive sampling scheme can be used by the controller 144 to compress the extension pressure data as shown in FIG. 27. The sampling period can be incremented to decimate the original pressure data until the remaining extension data samples can be encoded (e.g., coded) within the bandwidth. In order to adapt to various noise levels and pressure changes, multiple available bandwidths are allowed. In an example embodiment, two available bandwidths are assigned for simplicity. However, it is understood that multiple bandwidths can be assigned in accordance with the present disclosure. As shown in FIG. 27, two bandwidths are assigned (Block 2702). For example, the controller 144 assigns two bandwidths $N_{b1}$ and $N_{b2}$ where $N_{b1}$ is less than $N_{b2}$. These two bandwidths are assigned based upon the respective extension curves.

A decimation table for the candidate decimation periods is generated (Block 2704). For instance, the controller 144 generates a decimation table to include the candidate decimation periods based upon: (1) having one or more decimation periods that comprises about twelve (12) seconds to about two hundred (200) seconds at a four (4) second stepsize; and (2) the maximum number of extension data samples after decimation is twelve (12) for a total extension time less than or equal to five (5) minutes and twenty-six (26) otherwise. In some examples, the number of extension data samples can be the same after decimation at different decimation periods. In these instances, the lowest decimation period is maintained in the decimation table. As shown in FIG. 27, the original extension data is averaged and decimated at thirty-six (36) second periods and quantized at six (6) psi resolution (Block 2706).

A determination is made of whether flat line detection can be applied for the extension sections (Decision Block 2708). If the flat line detection can be applied (Yes from Decision Block 2708), the ending extension data samples (e.g., data points) for the extension sections are encoded (Block 2710). A determination is then made of whether the lower bandwidth is sufficient for the encoded (e.g., compressed) extension bits representing the extension data and the header bits (Decision Block 2712). If the lower bandwidth (bandwidth $N_{b1}$) is sufficient (Yes from Decision Block 2712), the encoded (e.g., compressed) extension bits are utilized for multiple on-demand frame construction (Block 2714). For respective extension sections (or the extension section after pump-on if the extension section before pump-off is not available), the maximum difference among the de-quantized values is evaluated. If the maximum difference is less than or equal to a preselected psi value (e.g., six (6) psi) for both extension sections (or the extension section after pump-on if applicable), the extension pressure curves are assumed as flat lines and the ending pressure points are encoded by the controller 144 according to the compression protocol. The encoded ending pressure points can then be utilized for the multiple on-demand frame construction as described below.

If the flat line detection cannot be applied (No from Decision Block 2708), a determination of whether the total extension time is less than or equal to a preselected time threshold (Decision Block 2716). For example, the preselected time threshold may be five (5) minutes. If the total extension time is less than or equal to a preselected time threshold (Yes from Decision Block 2716), the extension data samples are attempted to be encoded at the lower bandwidth (Block 2718). For example, if the total extension time length is five (5) minutes or less, the respective compression protocol attempts to compress respective extension data samples at less than sixty (60) seconds or a lower decimation period (i.e., the sampling period after decimation) within the lower bandwidth (bandwidth $N_{b1}$).

If a failure occurs (Yes from Decision Block 2720), the compression protocol increases the bandwidth to a higher bandwidth and searches for the lowest decimation period at which respective extension data samples can be encoded (Block 2722). In the event that the total extension time length is greater than a defined time threshold (e.g., five (5) minutes), the controller 144 automatically encodes, utilizing the compression protocol, the extension data within the higher bandwidth. As shown in FIG. 27, the encoded extension data is then subjected to a post-processing protocol (Block 2724). During post-processing, the averaged extension data samples can be replaced by the original values in the respective extension sections (e.g., pump-up extension section, pump-down extension section). If (1) the mean amplitude error (MAE) between the original curve and the linear interpolation curve is lowered and (2) the new quantized difference values can be coded using the available bandwidth, the original value is maintained for that extension data sample. As shown in FIG. 27, the encoded (e.g., compressed) extension bits are utilized for multiple on-demand frame construction (Block 2714).

In an embodiment, an averaging scheme may be used as filtering before decimation. In this embodiment, the pressure values are quantized with a step size of a preselected psi value (e.g., six (6) psi). The quantized values are then processed using differential coding. To handle various scenarios, five coders, one sign-magnitude coding, and four entropy coding with different code books are applied and the one using the least coding bits is finally selected.

Transmission of Extension Pressure Data

The compression data bits from the two (2) steps described above can be combined together and then encapsulated (e.g., encoded) into a sequence of multiple on-demand frames for real-time (or near real-time) transmission. The compression bits for extension sections are embedded in the last multiple on-demand frame in the sequence. Header bits can contain the information regarding data extension. One example with a sequence of three (3) multiple on-demand frames is shown in FIG. 28, where SyncWord/ShortFID/SubMODFID are headers for multiple on-demand frame construction, Sequence # dpoints are used to locate a particular multiple on-demand frame in the sequence, and the error correcting bits are used to protect the compressed pressure data from noise.

Experimental Results

Compared to pumps-off annular pressure while drilling, an additional range of about twelve percent (12%) to about twenty-three percent (23%) bandwidth is used by data extension for fifteen (15) minute pipe connections and five percent (5%) to fifteen percent (15%) for one (1) hour leakoff tests or formation integrity tests.

Figure 29:
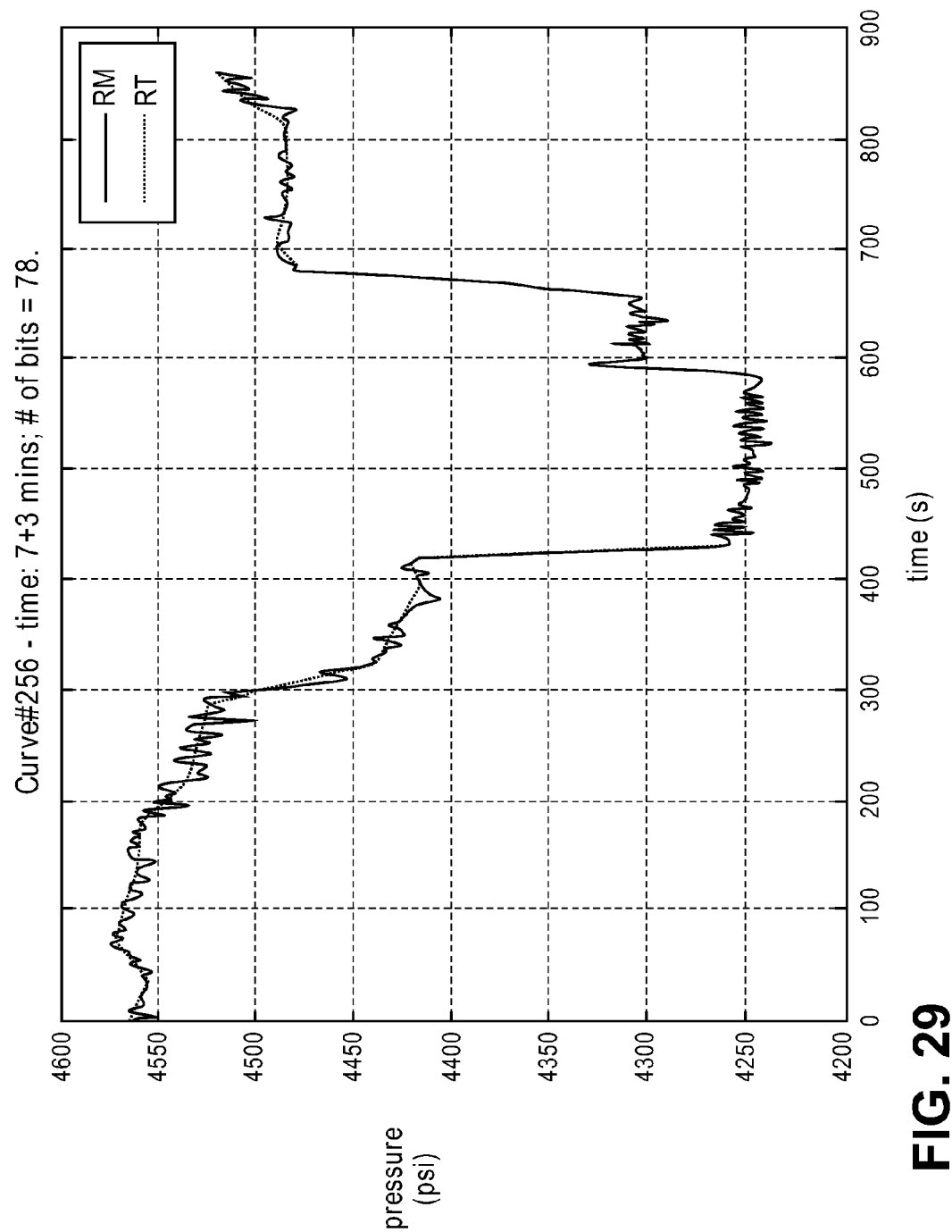
FIG. 29 illustrates a comparison of real-time and memory curves for a case with a 7-minute data extension before pumps-off and a 3-minute data extension after pumps-on in accordance with an example embodiment of the present disclosure.

In some cases, the major pressure change trends in extension sections can be captured in real-time pressure curves. One example of a seven (7) minute extension pressure data before pumps-off and three (3) minutes after pumps-on is shown in FIG. 29.

High-Density FIT APWD Analysis

Figure 30:
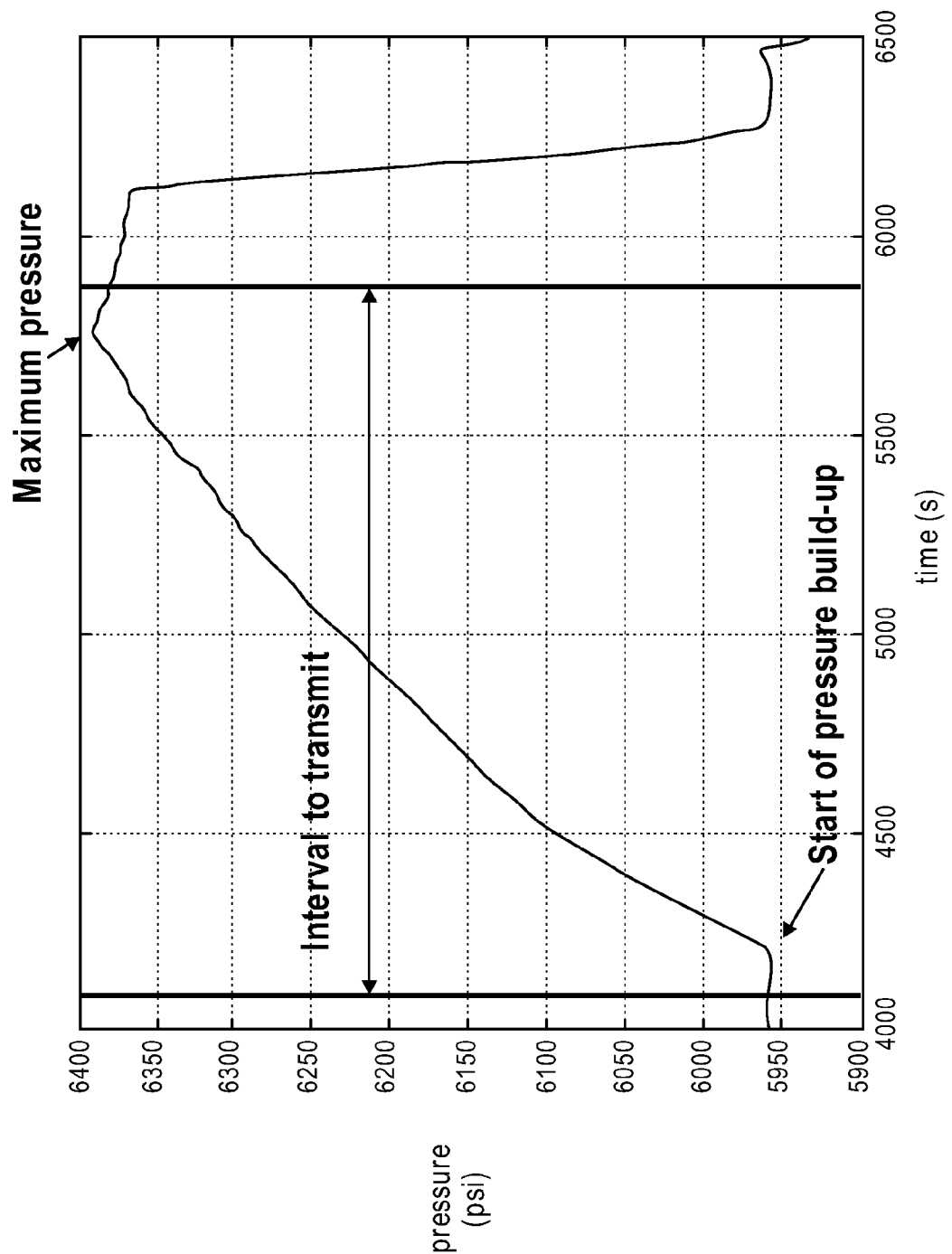
FIG. 30 illustrates annular pressure while drilling (APWD) data along the pressure build-up in a formation integrity test (FIT) in accordance with an example embodiment of the present disclosure.

As shown in FIG. 30, the high-density real-time data in the pressure build-up part can be utilized for formation integrity testing analysis. Extension pressure data of several minutes for both pumps-off/pumps-on can be used. As shown in FIG. 30, the time resolution is about two (2) seconds to about five (5) seconds and the pressure resolution is +/−1.5 psi.

Detection of Pressure Build-Up

Figure 31:
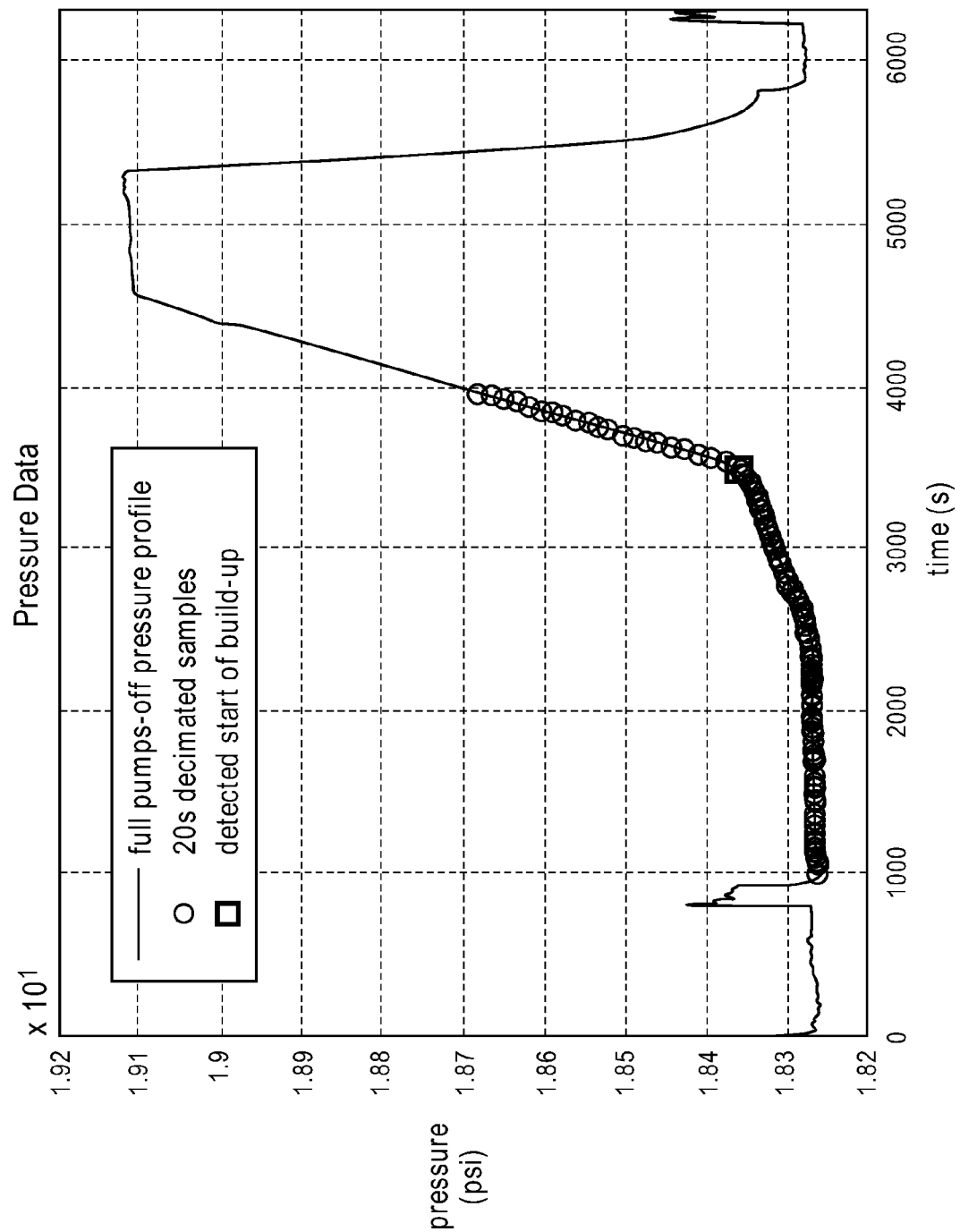
FIG. 31 illustrates detection of pressure build-up in accordance with an example embodiment of the present disclosure.

During detection of a pressure build-up, the first task is to identify (e.g., detect) the pressure build-up apart from the full pumps-off pressure profile, and the ending point is selected as the maximum pressure point. To detect the start of pressure build-up, the raw pressure values before the maximum pressure are first passed into a moving averaging filter of a twenty (20) second window size and then decimated into sampling data of twenty (20) second periods. The start of build-up is detected as the last decimated point whose difference from its previous sample is less than five (5) psi. To save searching time, the decimated samples between the minimum pressure point and the point of (maximum pressure+minimum pressure)/2 are evaluated. An example is shown in FIG. 31.

Compression of Pressure Values

The pressure data in the build-up portion are first quantized with a step size that equals about three (3) psi. Differential coding is then applied to the quantized pressure values. Both sign-magnitude coding and entropy coding are applied to the difference pressure values and the coding (e.g., sign-magnitude coding or entropy coding) providing the least coding bits is used.

Transmission of Compression Results

Figure 32:
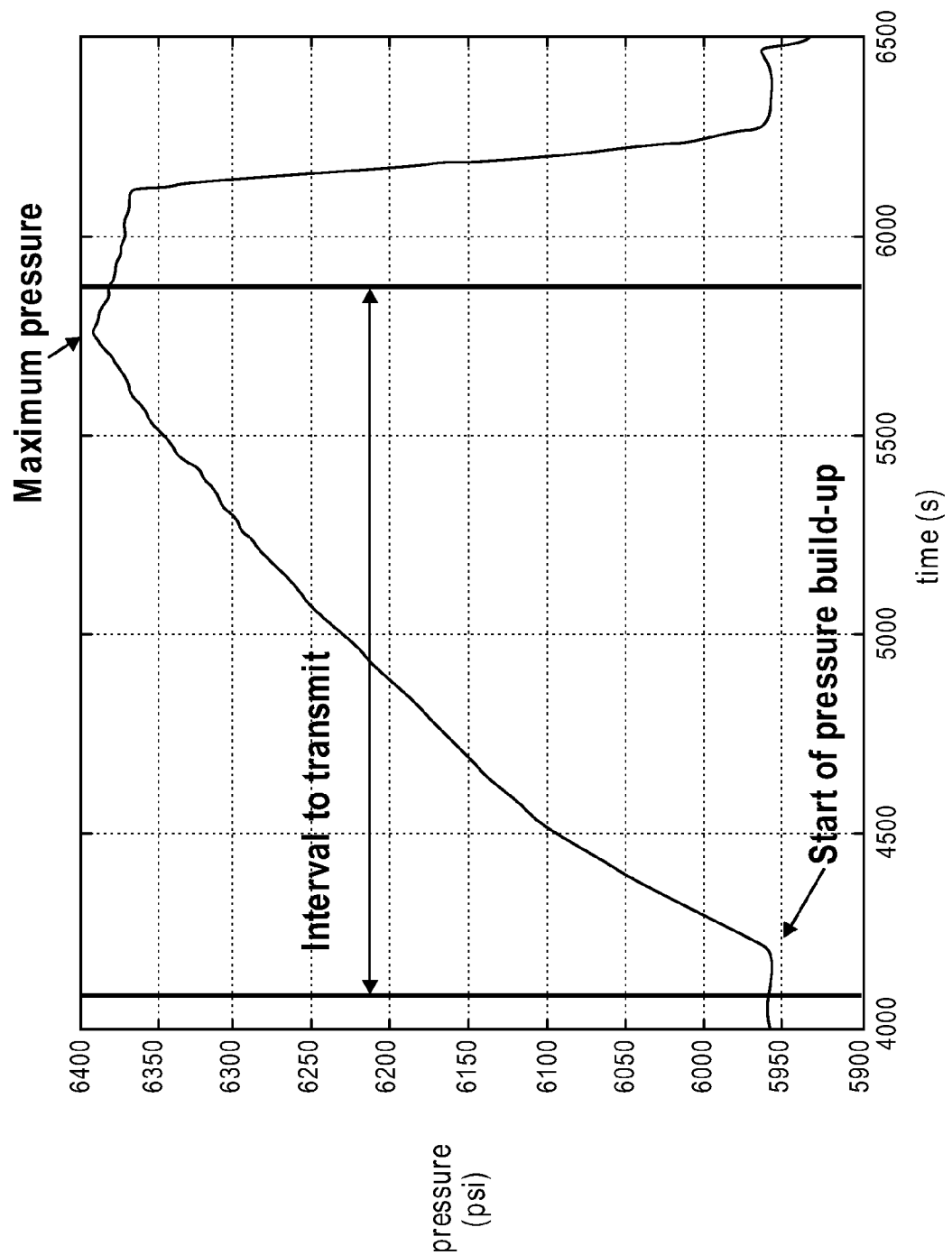
FIG. 32 illustrates transmission of high-density formation integrity test annular pressure while drilling data through multiple on-demand frames in accordance with an example embodiment of the present disclosure.

The compression bits can be encapsulated into a sequence of multiple on-demand frames for real-time transmission. Respective multiple on-demand frame reconstructs a section of the formation integrity test pressure build-up, as shown in FIG. 32. Within each multiple on-demand frame, the first pressure point is coded as a reference point and other pressure points are coded differentially. As such, respective multiple on-demand frames can be decoded independently so that a portion of the pressure curve is available if some multiple on-demand frames are missing or corrupted.

Experimental Results

Figure 33:
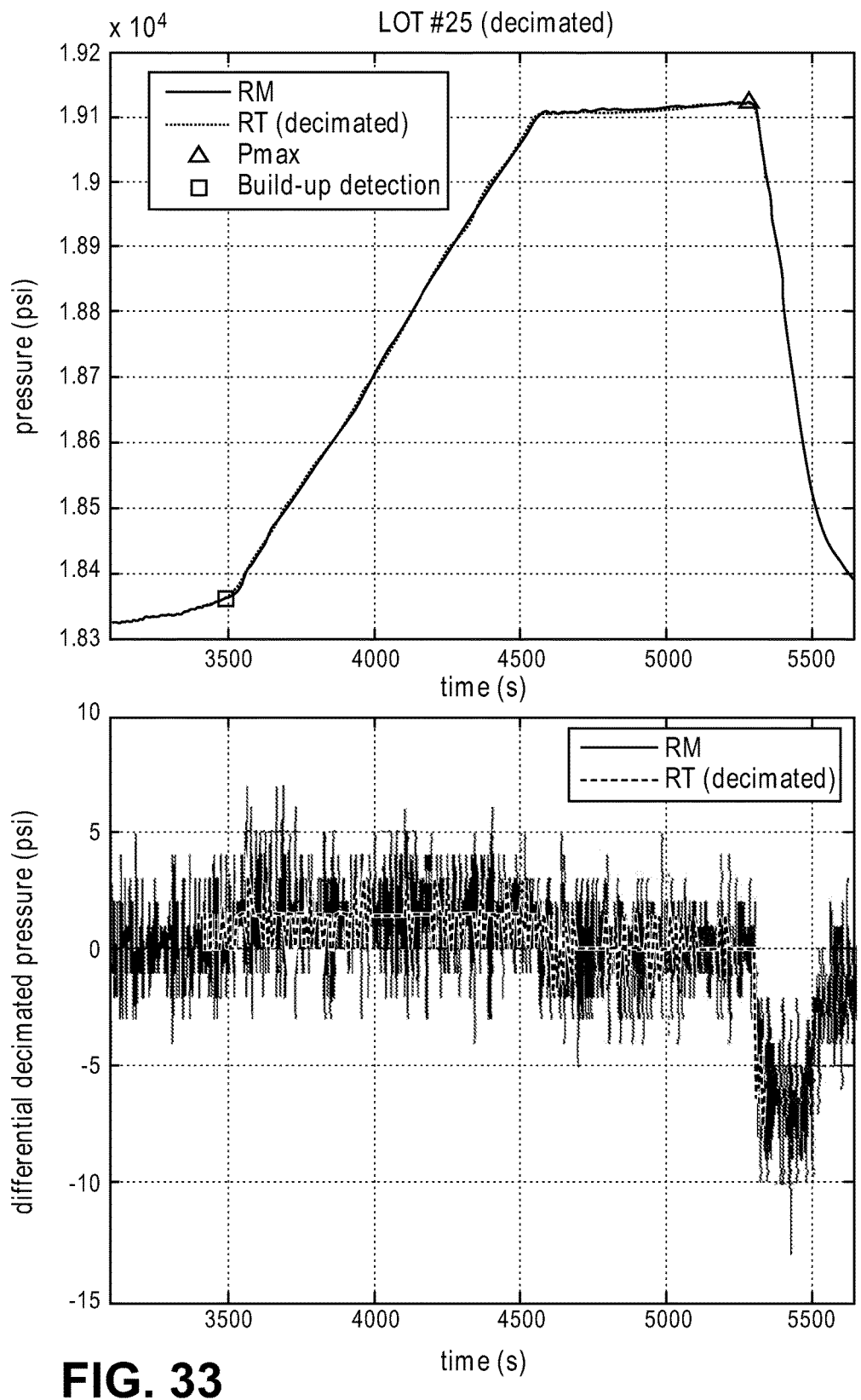
FIG. 33 illustrates an example of 32.5-minute pressure build-up in a formation integrity testing scenario in accordance with example embodiments of the present disclosure.

One example of a 32.5-minute pressure build-up is shown in FIG. 33. After filtering and decimation to four (4) second sampling periods, the pressure data is encoded into five (5) MODFs and the total transmission time is 5.2 minutes at the telemetry speed of six (6) bits/second. The average number of bits for each pressure point is 3.85.

Although only a few example embodiments have been described in detail above, those skilled in the art will readily appreciate that many modifications are possible in the example embodiments without materially departing from the present disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 120, paragraph 6 for any limitations of any of the claims herein, except for those in which the claim expressly uses the words 'means for' together with an associated function.

What is claimed is:

1. A method for transmitting a pump-off pressure profile from a downhole tool located in a bottom hole assembly to a surface location, the method comprising:
 causing the downhole tool to measure pump off pressure data in a subterranean wellbore;
 preprocessing the pump off pressure data to define a pressure curve wherein the preprocessing includes removing data points from the pressure data that are greater than an upper threshold or less than a lower threshold;
 selecting major points along the pressure curve such that an interpolation curve based on the major points approximates the pressure curve with an error less than an error threshold;
 compressing the major points to generate a plurality of compression bits, the plurality of compression bits representing the major points and the pressure curve; and
 causing a communications module located in the bottom hole assembly to transmit the plurality of compression bits from the bottom hole assembly to a computing device at the surface location;
 wherein said preprocessing, said selecting major points, and said compressing is performed by a controller located in the bottom hole assembly.

2. The method of claim 1, wherein said transmitting comprises transmitting the compression bits with a sequence of multiple on-demand frames.

3. The method of claim 2, further comprising appending error correcting parity bits to at least one multiple on-demand frame of the sequence of multiple on-demand frames.

4. The method of claim 1, further comprising appending data extension time data to the pump-off pressure data during at least one of a pumps-up transition period or a pumps-down transition period.

5. The method of claim 1, wherein the pump-off pressure data comprises high density annular pressure while drilling data for leakoff testing (LOT).

6. The method of claim 1, further comprising appending compressed extension pressure data to the plurality of compression bits, the compressed extension pressure data corresponding to at least one of a pump-down transition period or a pump-on transition period.

7. The method of claim 1, wherein the preprocessing further comprises applying a uniform decimation to the pressure data if a time length associated with the pressure data exceeds a time threshold.

8. The method of claim 1, wherein the error threshold comprises a first error threshold, a second error threshold, and a third error threshold that define errors between adjacent ones of the major points.

9. The method of claim 8, wherein the first error threshold defines a maximum absolute error, the second error threshold defines a maximum distance and the third error threshold defines an absolute value of mean error between the interpolation curve and the pressure curve.

10. A system for transmitting a pump-off pressure profile to a surface location above a subterranean wellbore, the system comprising:
 a downhole measurement tool configured to measure pump-off pressure data, the downhole measurement tool deployed in a bottom hole assembly which is in turn deployed in a subterranean wellbore;
 the bottom hole assembly comprising a controller configured to (i) cause the downhole measurement tool to measure the pump-off pressure data; (ii) preprocess the pump off pressure data to define a pressure curve, wherein said preprocessing includes removing data points from the pressure data that are greater than an upper threshold or less than a lower threshold; (iii) select major points along the pressure curve such that an interpolation curve based on the major points approximates the pressure curve with an error less than an error threshold; and (iv) compress the major points to generate a plurality of compression bits, the plurality of compression bits representing the major points and the pressure curve; and
 a communications module located in the bottom hole assembly and configured to transmit the plurality of compression bits from the bottom hole assembly to a computing device at the surface location.

11. The system of claim 10, wherein the communication module is configured to transmit the compression bits with a sequence of multiple on-demand frames.

12. The system of claim 11, wherein the controller is configured to append error correcting parity bits to at least one multiple on-demand frame of the sequence of multiple on-demand frames.

13. The system of claim 10, wherein the controller is further configured to append data extension time data to the pump-off pressure data during at least one of a pumps-up transition period or a pumps-down transition period.

14. The system of claim 10, wherein the pump-off pressure data comprises high density annular pressure while drilling data for leakoff testing (LOT).

15. The system of claim 10, wherein the communication module comprises a plurality of valves, wherein the controller is further configured to cause the plurality of valves to modulate a flow of drilling fluid, the modulated drilling fluid representing the plurality of compression bits.

16. The system of claim 10, wherein said preprocessing further comprises applying a uniform decimation to the pressure data if a time length associated with the pressure data exceeds a time threshold.

17. The method of claim 10, wherein the error threshold comprises a first error threshold, a second error threshold, and a third error threshold that define errors between adjacent ones of the major points.

18. The method of claim 17, wherein the first error threshold defines a maximum absolute error, the second error threshold defines a maximum distance and the third error threshold defines an absolute value of mean error between the interpolation curve and the pressure curve.

* * * * *